United States Patent
Yang et al.

(10) Patent No.: US 12,058,004 B2
(45) Date of Patent: Aug. 6, 2024

(54) NETWORK NODES AND METHODS THEREIN FOR PROVIDING BINDING INDICATION

(71) Applicant: Telefonaktiebolaget LM Ericsson (publ), Stockholm (SE)

(72) Inventors: Yong Yang, Kållered (SE); Yunjie Lu, Shanghai (CN); Chunbo Wang, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/263,700

(22) PCT Filed: Jan. 26, 2022

(86) PCT No.: PCT/CN2022/073974
§ 371 (c)(1),
(2) Date: Jul. 31, 2023

(87) PCT Pub. No.: WO2022/161391
PCT Pub. Date: Aug. 4, 2022

(65) Prior Publication Data
US 2024/0073095 A1 Feb. 29, 2024

(30) Foreign Application Priority Data

Jan. 31, 2021 (WO) ............... PCT/CN2021/074570

(51) Int. Cl.
*H04L 45/00* (2022.01)
*H04L 41/0893* (2022.01)
*H04L 41/0896* (2022.01)
*H04L 41/5054* (2022.01)

(52) U.S. Cl.
CPC ...... *H04L 41/0896* (2013.01); *H04L 41/0893* (2013.01); *H04L 41/5054* (2013.01)

(58) Field of Classification Search
CPC ............. H04L 41/0893; H04L 41/0896; H04L 41/5054
See application file for complete search history.

(56) References Cited

U.S. PATENT DOCUMENTS

| | | | |
|---|---|---|---|
| 2020/0007632 A1* | 1/2020 | Landais | H04L 67/02 |
| 2021/0168215 A1* | 6/2021 | Zong | H04L 67/146 |
| 2021/0258871 A1* | 8/2021 | Jeong | H04W 8/065 |
| 2021/0274392 A1* | 9/2021 | Dao | H04W 36/18 |

(Continued)

FOREIGN PATENT DOCUMENTS

CN 110830543 A 2/2020

OTHER PUBLICATIONS

International Search Report and Written Opinion, App. No. PCT/CN2022/073974, May 4, 2022, 16 pages.

(Continued)

*Primary Examiner* — John B Walsh
*Assistant Examiner* — Hassan A Khan
(74) *Attorney, Agent, or Firm* — Nicholson De Vos Webster & Elliott LLP

(57) ABSTRACT

A method in a first Network Function (NF). The method includes: transmitting, to a second NF, a message containing a first binding indication associated with a context hosted by the first NF, the message or the first binding indication containing a parameter identifying a group of contexts.

16 Claims, 9 Drawing Sheets

(56) References Cited

U.S. PATENT DOCUMENTS

| | | | | |
|---|---|---|---|---|
| 2022/0014888 | A1* | 1/2022 | S Bykampadi | H04W 12/76 |
| 2022/0038545 | A1* | 2/2022 | Krishan | H04L 67/1014 |
| 2022/0060547 | A1* | 2/2022 | Krishan | H04L 67/51 |
| 2022/0132454 | A1* | 4/2022 | Youn | H04W 60/00 |
| 2022/0247827 | A1* | 8/2022 | Das | G06F 11/1423 |
| 2022/0322053 | A1* | 10/2022 | Das | H04L 41/0893 |
| 2022/0400401 | A1* | 12/2022 | Gupta | H04L 45/85 |
| 2023/0007456 | A1* | 1/2023 | Krishan | H04M 15/66 |
| 2023/0035572 | A1* | 2/2023 | Belling | H04L 41/5058 |
| 2024/0007934 | A1* | 1/2024 | Jeong | H04W 76/11 |

OTHER PUBLICATIONS

Written Opinion of the International Preliminary Examining Authority, App. No. PCT/CN2022/073974, Dec. 15, 2022, 10 pages.

International Preliminary Report on Patentability, App. No. PCT/CN2022/073974, Apr. 13, 2023, 23 pages.

3GPP TS 23.003 V17.0.0, "3rd Generation Partnership Project; Technical Specification Group Core Network and Terminals; Numbering, addressing and identification; (Release 17)," Dec. 2020, 142 pages, 3GPP Organizational Partners.

3GPP TS 23.501 V16.7.0, "3rd Generation Partnership Project; Technical Specification Group Services and System Aspects; System architecture for the 5G System (5GS); Stage 2 (Release 16)," Dec. 2020, 450 pages, 3GPP Organizational Partners.

3GPP TS 23.502 V16.7.1, "3rd Generation Partnership Project; Technical Specification Group Services and System Aspects; Procedures for the 5G System (5GS); Stage 2 (Release 16)," Jan. 2021, 603 pages, 3GPP Organizational Partners.

3GPP TS 23.527 V16.5.0, "3rd Generation Partnership Project; Technical Specification Group Core Network and Terminals; 5G System; Restoration Procedures (Release 16)," Dec. 2020, 24 pages, 3GPP Organizational Partners.

3GPP TS 29.500 V16.6.0, "3rd Generation Partnership Project; Technical Specification Group Core Network and Terminals; 5G System; Technical Realization of Service Based Architecture; Stage 3 (Release 16)," Dec. 2020, 85 pages, 3GPP Organizational Partners.

3GPP TS 29.500 V17.1.0, "3rd Generation Partnership Project; Technical Specification Group Core Network and Terminals; 5G System; Technical Realization of Service Based Architecture; Stage 3 (Release 17)," Dec. 2020, 90 pages, 3GPP Organizational Partners.

3GPP TS 29.510 V17.0.0, "3rd Generation Partnership Project; Technical Specification Group Core Network and Terminals; 5G System; Network Function Repository Services; Stage 3 (Release 17)," Dec. 2020, 229 pages, 3GPP Organizational Partners.

3GPP TS 29.571 V17.0.0, "3rd Generation Partnership Project; Technical Specification Group Core Network and Terminals; 5G System; Common Data Types for Service Based Interfaces; Stage 3 (Release 17)," Dec. 2020, 128 pages, 3GPP Organizational Partners.

Ericsson, "Update Binding Indication for multiple resource contexts," Feb. 23-Mar. 5, 2021, 7 pages, 3GPP TSG-CT WG4 Meeting #102e, C4-211abc, E-Meeting.

Ericsson, "Binding indication with the scope set to other service," Nov. 3-13, 2020, 5 pages, 3GPP TSG-CT WG4 Meeting #101e, C4-205212, E-Meeting.

Ericsson et al., "Update Binding Indication for multiple resource contexts," Feb. 24-Mar. 5, 2021, 7 pages, 3GPP TSG-CT WG4 Meeting #102e, C4-211703, E-Meeting.

Nokia et al., "Correction to binding procedures," Apr. 14-23, 2021, 10 pages, 3GPP TSG-CT WG4 Meeting #103-e, C4-212081, E-Meeting.

Ericsson, "Group Binding for NF (Service) Levels," Jan. 17-21, 2022, 10 pages, 3GPP TSG-CT WG4 Meeting #107-bis-e, C4-220373, E-Meeting.

Examination Report, CA App. No. 2022212145, Oct. 25, 2023, 5 pages.

T. Berners-Lee et al., "Uniform Resource Identifier (URI): Generic Syntax," Jan. 2005, 61 pages, Network Working Group, Request for Comments: 3986, The Internet Society.

P. Resnick, "Internet Message Format," Oct. 2008, 57 pages, Network Working Group, Request for Comments: 5322, The IETF Trust.

R. Fielding et al., "Hypertext Transfer Protocol (HTTP/1.1): Message Syntax and Routing," Jun. 2014, 89 pages, Request for Comments: 7230.

R. Fielding et al., "Hypertext Transfer Protocol (HTTP/1.1): Semantics and Content," Jun. 2014, 101 pages, Request for Comments: 7231.

Office Action, AU App. No. 2022212145, Apr. 26, 2024, 4 pages.

\* cited by examiner

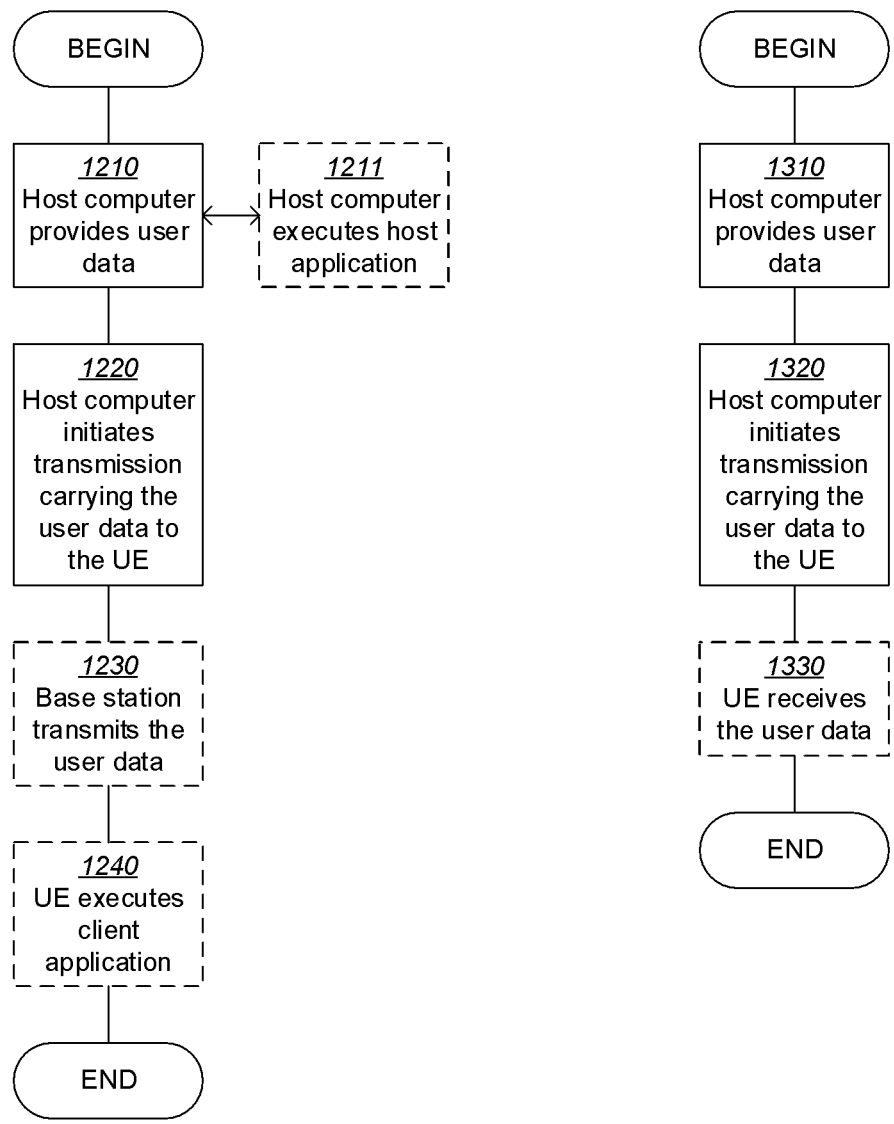

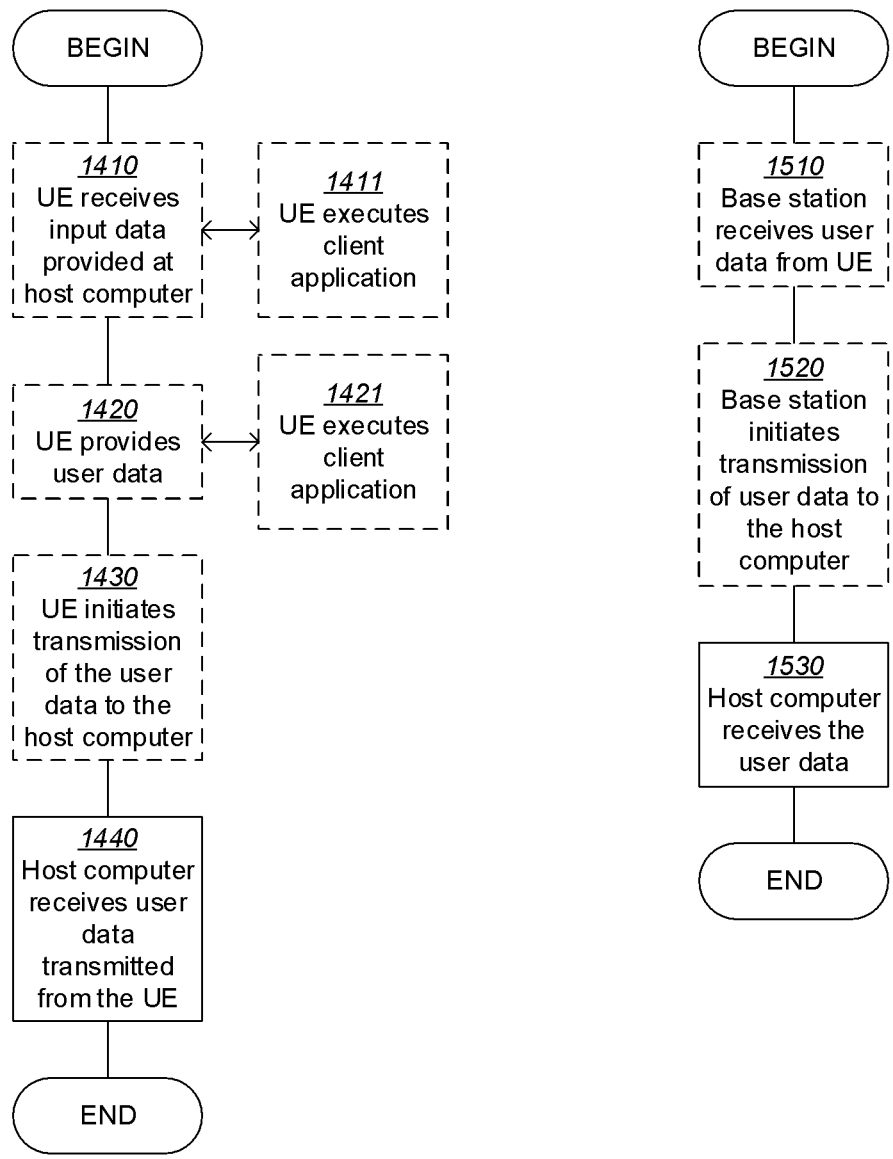

NETWORK NODES AND METHODS THEREIN FOR PROVIDING BINDING INDICATION

CROSS-REFERENCE TO RELATED APPLICATIONS

This application is a National stage of International Application No. PCT/CN2022/073974, filed Jan. 26, 2022, which claims priority to International Application No. PCT/CN2021/074570, filed Jan. 31, 2021, which are hereby incorporated by reference.

TECHNICAL FIELD

The present disclosure relates to communication technology, and more particularly, to network nodes and methods therein for providing a binding indication.

BACKGROUND

In Release 16 (Rel-16), the $3^{rd}$ Generation Partnership Project (3GPP) has further broaden the use of Network Function (NF) Set concept to be applicable for all types of NFs in the $5^{th}$ Generation (5G) Core.

The 3GPP Technical Specification (TS) 23.501, V16.7.0, which is incorporated herein by reference in its entirety, gives a list of definitions related to NF service, NF service set, NF and NF set:
  NF instance: an identifiable instance of the NF;
  NF service: a functionality exposed by an NF through a service based interface and consumed by other authorized NFs;
  NF service instance: an identifiable instance of the NF service;
  NF service operation: an elementary unit an NF service is composed of;
  NF Service Set: a group of interchangeable NF service instances of the same service type within an NF instance (the NF service instances in the same NF Service Set have access to the same context data); and
  NF Set: a group of interchangeable NF instances of the same type, supporting the same services and the same Network Slice(s) (the NF instances in the same NF Set may be geographically distributed but have access to the same context data.

As specified in clause 5.21.3.1 of TS 23.501, several NF instances can be deployed within an NF Set to provide distribution, redundancy and scalability together as a set of NF instances. In this case, an NF can be replaced with an alternative NF within the same NF Set in case of failure, load balancing, or load re-balancing. This applies for both service operations and notification delivery.

For a specific resource (context), an NF may assign specific redundancy scope within which the resource can be restored. The NF indicates this redundancy scope of the resource (context) to the peer NF with information so called "Binding Indication". In case of failure of NF (service) instance, or to perform load re-balancing, the peer NF may use the "Binding Indication" to select alternative NF (service) instance within the redundancy scope, thus the resource (context) can be restored successfully. A Binding Indication is information included by an NF service producer to an NF service consumer in request responses or notifications to convey the scope within which selection/reselection of target NF/NF Services may be performed, or information included by the NF service consumer in requests or subscriptions to convey the scope within which selection/reselection of notification targets or the selection of other service(s) that the NF consumer produces for the same data context may be performed.

As specified in clause 6.3.1.0 of TS 23.501, binding can be used to indicate suitable target NF producer instance(s) for NF service instance selection, reselection and routing of subsequent requests associated with a specific NF producer resource (context) and NF service. This allows an NF service producer (or referred to as NF producer) to indicate that an NF service consumer (or referred to as NF consumer), for a particular context, should be bound to an NF service instance, NF instance, NF service set or NF set depending on local policies and other criteria (e.g. at what point it is in the middle of a certain procedure, considering performance aspects, etc.). Binding can also be used by the NF consumer to indicate suitable NF consumer instance(s) for notification target instance reselection and routing of subsequent notification requests associated with a specific notification subscription and for providing Binding Indication for service(s) that the NF consumer produces for the same data context and the NF service producer is subsequently likely to invoke.

The Binding Indication can be contained in a Hyper Text Transfer Protocol (HTTP) header, 3gpp-Sbi-Binding, referring to the 3GPP TS 29.500, V17.1.0, which is incorporated herein by reference in its entirety. This header contains a comma-delimited list of Binding Indications from an HTTP server for storage and subsequent use by an HTTP client. The encoding of the header follows the Augmented Backus-Naur Form (ABNF) as defined in Internet Engineering Task Force (IETF) Request for Comments (RFC) 7230, June 2014.

3gpp-Sbi-Binding="3gpp-Sbi-Binding" ":"#(OWS "bl=" blvalue 1*(OWS ";" parameter))
blvalue="nfinstance"/"nfset"/"nfserviceinstance"/"nfserviceset"
parameter=parametername "=" token
parametername="nfinst"/"nfset"/"nfservinst"/"nfserviceset"/"servname"/"scope"
scope="other-service"/"callback"/"subscription-events"
  The following parameters are defined:
    bl (binding level): indicates a binding to either a NF Instance, a NF set, a NF Service Instance or a NF Service Set.
    nfinst (NF instance): indicates a NF Instance ID.
    nfset (NF set): indicates a NF Set ID.
    nfservinst (NF service instance): indicates a NF Service Instance ID.
    nfserviceset (NF service set): indicates a NF Service Set ID.
    scope: indicates the applicability of a Binding Indication in a service request.
    This may take one of the following values:
      "other-service": the binding information applies to other service(s) that the NF Service Consumer may later on provide as an NF Service Producer;
      "subscription-events": the binding information applies to subscription change event notifications;
      "callback": the binding information applies to notification or callback requests.
    The absence of this parameter in a Binding Indication in a service request shall be interpreted as "callback".
    Two scope parameters may be present in a Binding Indication if the binding information applies to notification/callback requests and to other services.

servname (service name): indicates the name of a service or a custom service, i.e.:
- the name of the service that handles a notification or a callback request, when present in a Binding Indication for a subscription or a callback, i.e. with a scope parameter absent or set to "callback"; or
- the name of the other service(s) for which the binding applies, when present in a Binding Indication in a service request for the other services the NF Service Consumer can provide later on as an NF Service Producer, i.e. with the scope parameter set to "other-service". More than one servname parameter may be present to represent multiple such services. The absence of this parameter in a Binding Indication with the scope parameter set to "other-service" shall be interpreted as binding information that applies to all the services that the NF Service Consumer may provide later as an NF Service Producer.
- the definition and encoding of the blvalue and other parameters shall be as defined for the 3gpp-Sbi-Routing-Binding.

An NF may become aware of a peer NF (service) instance change by receiving an updated binding information, as specified in clause 6.5.3.2 and 6.5.3.3 of TS 29.500.

For example, an NF service producer may become aware of a NF service consumer change, via receiving updated binding information (i.e., when the binding entity corresponding to the binding level is changed), or via an Error response to a notification, via link level failures (e.g., no response from the NF), or via a notification from an NF Repository Function (NRF) that the NF service consumer has deregistered. The HTTP error response may be a 3xx redirect response pointing to a new NF service consumer. When the binding entity other than the one corresponding to the binding level is changed, it indicates the resilience information of the session is changed, i.e., more or less consumer instances are able to handle the Notification/Callback request message; the NF service producer is not expected to change Notification/Callback Uniform Resource Identifier (URI). When becoming aware of an NF service consumer change, and if the new NF service consumer is not known, the NF service producer shall select a new NF service consumer as specified in clause 6.6 of 3GPP TS 23.527, V16.5.0 (which is incorporated herein by reference in its entirety). If binding information is available and the binding mechanism is supported by the NF service producer, the reselection should be based on the binding information, as specified in clause 6.6.2 of 3GPP TS 23.527, in clause 6.3.1.0 of 3GPP TS 23.501 and in clause 4.17.12.4 of 3GPP TS 23.502, V16.7.1 (which is incorporated herein by reference in its entirety). If binding information is not available or the binding mechanism is not supported by the NF service producer, the reselection is performed as specified in clause 6.6.3 of 3GPP TS 23.527. When becoming aware of an NF service consumer change, the NF service producer or Service Communication Proxy (SCP) shall replace the authority part of the Notification/Callback URI with the new NF service consumer information and shall use that URI in subsequent communications, as specified in clause 6.6 of 3GPP TS 23.527.

Similarly, an NF service consumer may become aware of a NF service producer change, by receiving an updated binding information (i.e., when the binding entity corresponding to the binding level is changed), or via an Error response from the old or a selected new NF service producer, via link level failures (e.g. no response from the NF), or via a notification from an NRF that the NF has deregistered. The HTTP error response may be a 3xx redirect response pointing to a new NF. When the binding entity other than the one corresponding to the binding level is changed, it indicates the resilience information of the resource context is changed, i.e. more or less service instances are able to handle the service request message; the NF service consumer is not expected to change the location of the resource context in the NF service producer. When becoming aware of an NF service producer change, and if the new NF service producer is not known, the NF service consumer shall select a new NF service producer, as specified in clause 6.5 of 3GPP TS 23.527. If binding information is available and the binding mechanism is supported by the NF service consumer, the reselection should be based on the binding information, as specified in clause 6.12 of 3GPP TS 29.500 (see also clause 6.5.2 of 3GPP TS 23.527) and in clause 6.3.1.0 of 3GPP TS 23.501. If binding information is not available or the binding mechanism is not supported by the NF service consumer, the reselection is performed as specified in clause 6.5.3 of 3GPP TS 23.527. When becoming aware of an NF service producer change, the NF service consumer or SCP shall replace the Application Programming Interface (API) root (apiRoot) of the resource URI with the new NF service producer's apiRoot and shall use that URI in subsequent communications as specified in clause 6.5 of 3GPP TS 23.527.

SUMMARY

When support of NF Set is deployed in the network, i.e., 5GC, and when an NF fails, resource (session) contexts which were served by the failed NF can be seamlessly handed over to any NF in the same NF set. The new NF may be selected by the peer NF reactively, such that the selected NF has to retrieve the resource (session) context from a central database, e.g., an Unstructured Data Storage Function (UDSF), where the context is stored. Alternatively, an NF from the same NF Set may proactively take over some contexts (which were served by the failed NF), i.e., preload the contexts into its cache, to avoid contacting UDSF upon receiving a request associated with a context from a peer NF, thereby reducing signaling latency. In fact, an NF failure often leads a large amount of signaling towards the UDSF for retrieving contexts affected by the failure, which may lead to an overload of the UDSF. Typically, loading a large amount of resource (session) contexts which were served by one NF to another NF may be required if the one NF fails, is put into maintenance mode, or is going to be scaled-in.

When taking a proactive approach to preload some contexts affected by a failure, to achieve load sharing in the NF Set, or an implementation specific algorithm, an NF may preload a plurality of contexts pertaining to a specific NF Service Instance, or a specific NF Service Set, or a specific NF instance, or a "group" of contexts which can be identified by a group identifier (e.g., a string), or an apiRoot, or a regular expression.

For example, an NF may need to manage a certain group of resources (contexts) together, with the same specific redundancy scope, e.g.:
- an Access and Mobility Management Function (AMF) may manage all User Equipment (UE) context resources (for different services) and callback contexts related to a certain UE on the same AMF instance;
- all Protocol Data Unit (PDU) sessions from a certain UE can be processed by the same Session Management Function (SMF) instance, and further select the same Policy Control Function (PCF) instance for traffic monitoring; and an SMF may prefer to managing all PDU sessions for one Data Network Name (DNN)/Slice with a specific group context, thus all the PDU sessions can be moved together to another SMF instance which takes over the DNN/Slice responsibility from the original SMF.

Currently, the binding indication can be used to proactively indicate to a peer entity that a resource (session) context has been moved from one NF (service) instance to another. However, the binding indication is assigned and communicated per resource (context) individually and independently, which has following limitations:

1. Reselection of alternative target NF (service) instances for resources (contexts) within a group, when needed, is performed per resource (context) and different alternative targets may be selected, which is not desired.
2. When an NF receives updated binding information for a specific resource (context), indicating that a peer NF has changed for the resource (context), there is no way for the receiving NF to identify that the peer NF has changed for all other resources (contexts) within a group. This causes the NF to repeat subsequent communications to other resources (contexts) in the group towards an original URI and get failure response per attempt repeatedly. When the NF is aware of the failure and reselects alternative target NF (service) instance, different alternative targets may be selected, as described above.
3. Proactively updating binding information to indicate NF changes would lead to a large amount of signaling in the network, which is not desired.

It is an object of the present disclosure to provide network nodes and methods therein, capable of solving at least one of the above problems.

According to a first aspect of the present disclosure, a method in a first NF is provided. The method includes: transmitting, to a second NF, a message containing a first binding indication associated with a context hosted by the first NF. The message or the first binding indication contains a parameter identifying a group of contexts.

In an embodiment, the first binding indication may be at least one of a 3gpp-Sbi-Binding header, 3gpp-Sbi-Routing-Binding header, and a header dedicated for multiple-context operation.

In an embodiment, the message or the first binding indication may further contain an indication that the message is for multiple-context operation when the parameter is carried in the 3gpp-Sbi-Binding header or the 3gpp-Sbi-Routing-Binding header.

In an embodiment, the message may include a service request, a service response, a subscription request, a subscription response, a notification or callback request, or a notification or callback response.

In an embodiment, the parameter may include at least one of: an NF service instance identifier, an NF service set identifier, or an NF instance identifier identifying an entity where the group of contexts was hosted previously, a first group identifier, or an apiRoot or a regular expression that is common to respective previous URIs for the group of contexts.

In an embodiment, the method may further include, when the parameter includes the first group identifier: prior to transmitting the message containing the first binding indication, transmitting, to the second NF, a request or response associated with at least one of the group of contexts, the request or response containing a second binding indication associated with the at least one context, the request or response or the second binding indication containing the first group identifier.

In an embodiment, the context may belong to the group of contexts.

In an embodiment, the message or the first binding indication may further contain a second group identifier assigned by the first NF for the group of contexts.

In an embodiment, the method may further include: retrieving, from an NRF, an NF profile of the second NF, the NF profile containing an indication of support of multiple-context operation; or receiving, from the second NF, a request or response containing an indication of support of multiple-context operation.

In an embodiment, each of the group of contexts may include a resource context or a session context.

In an embodiment, the first NF may be an NF service producer and the second NF may be an NF service consumer, or the first NF may be an NF service consumer and the second NF may be an NF service producer.

According to a second aspect of the present disclosure, a method in a second NF is provided. The method includes: receiving, from a first NF, a message containing a first binding indication associated with a context hosted by the first NF, the message or the first binding indication containing a parameter identifying a group of contexts; and performing an operation for each of the group of contexts based on the first binding indication.

In an embodiment, the first binding indication may be at least one of 3gpp-Sbi-Binding header, 3gpp-Sbi-Routing-Binding header, and a header dedicated for multiple-context operation.

In an embodiment, the message or the first binding indication may further contain an indication that the message is for multiple-context operation when the parameter is carried in the 3gpp-Sbi-Binding header or the 3gpp-Sbi-Routing-Binding header.

In an embodiment, the message may include a service request, a service response, a subscription request, a subscription response, a notification or callback request, or a notification or callback response.

In an embodiment, the parameter may include at least one of: an NF service instance identifier, an NF service set identifier, or an NF instance identifier identifying an entity where the group of contexts was hosted previously, a first group identifier, or an apiRoot or a regular expression that is common to respective previous URIs for the group of contexts.

In an embodiment, the method may further include, when the parameter includes the first group identifier: prior to receiving the message containing the first binding indication, receiving, from the first NF or from a third NF, a request or response associated with at least one of the group of contexts, the request or response containing a second binding indication associated with the at least one context, the request or response or the second binding indication containing the first group identifier.

In an embodiment, the context may belong to the group of contexts.

In an embodiment, the message or the first binding indication may further contain a second group identifier assigned by the first NF for the group of contexts.

In an embodiment, the method may further include: registering, in an NRF, an NF profile containing an indication of support of multiple-context operation; or transmitting, to the first NF, a request or response containing an indication of support of multiple-context operation.

In an embodiment, the operation of performing may include: updating binding information for each of the group of contexts based on the first binding indication.

In an embodiment, the first binding indication may contain a first binding entity corresponding to a binding level, and the operation of performing may further include, when the binding entity is changed from a second binding entity corresponding to the binding level in the binding information for any one of the group of contexts prior to updating: determining a binding entity change associated with the one context; and redirecting the one context to the first binding entity.

In an embodiment, the operation of redirecting may include: replacing a URI for the one context based on an apiRoot of the first binding entity.

In an embodiment, each of the group of contexts may include a resource context or a session context.

In an embodiment, the first NF may be an NF service producer and the second NF may be an NF service consumer, or the first NF may be an NF service consumer and the second NF may be an NF service producer.

According to a third aspect of the present disclosure, a method in a third NF is provided. The method includes: transmitting, to a second NF, a request or response associated with at least one context created or modified at the third NF. The request or response contains a binding indication for the at least one context. The request or response or the binding indication contains a group identifier associated with a group of contexts to which the at least one context belongs.

In an embodiment, the method may further include: retrieving, from an NRF, an NF profile of the second NF, the NF profile containing an indication of support of multiple-context operation; or receiving, from the second NF, a request or response containing an indication of support of multiple-context operation.

In an embodiment, each of the group of contexts may include a resource context or a session context.

In an embodiment, the third NF may be an NF service producer and the second NF may be an NF service consumer, or the third NF may be an NF service consumer and the second NF may be an NF service producer.

According to a fourth aspect of the present disclosure, a network node is provided. The network node includes a communication interface, a processor and a memory. The memory contains instructions executable by the processor whereby the network node is operative to, when implementing a first NF, perform the method according to the above first aspect, or when implementing a second NF, perform the method according to the above second aspect, or when implementing a third NF, perform the method according to the above third aspect.

According to a fifth aspect of the present disclosure, a computer-readable storage medium is provided. The computer-readable storage medium has computer-readable instructions stored thereon. The computer-readable instructions, when executed by a processor of a network node, configure the network node to, when implementing a first NF, perform the method according to the above first aspect, or when implementing a second NF, perform the method according to the above second aspect, or when implementing a third NF, perform the method according to the above third aspect.

With the embodiments of the present disclosure, a parameter identifying a group of contexts is provided in or along with a binding indication. Such parameter allows an operation based on the binding indication to be applied to each of the group of contexts, thereby achieving a consistent behavior or action for the group in a more efficient manner.

BRIEF DESCRIPTION OF THE DRAWINGS

The above and other objects, features and advantages will be more apparent from the following description of embodiments with reference to the figures, in which:

FIGS. 12 to 15 are flowcharts illustrating methods implemented in a communication system including a host computer, a base station and a user equipment.

DETAILED DESCRIPTION

In the present disclosure, a network function, or NF, can be implemented either as a network element on a dedicated hardware, as a software instance running on a dedicated hardware, or as a virtualized function instantiated on an appropriate platform, e.g. on a cloud infrastructure.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms. The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

Figure 1:
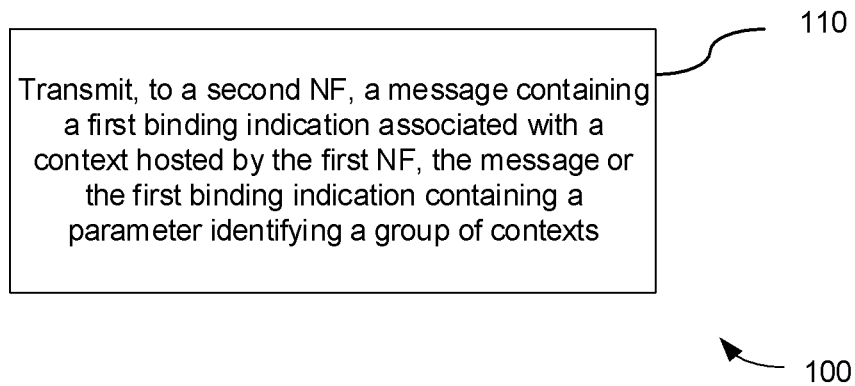
FIG. 1 is a flowchart illustrating a method in an NF according to an embodiment of the present disclosure.

FIG. 1 is a flowchart illustrating a method 100 according to an embodiment of the present disclosure. The method 100 can be performed at a first NF, which can be e.g., an NF service producer or an NF service consumer.

At block 110, a message containing a first binding indication associated with a context (which can be e.g., a resource context or a session context) hosted by the first NF is transmitted to a second NF (which can be e.g., an NF service consumer when the first NF is an NF service producer, or an NF service producer when the first NF is an NF service consumer). The message or the first binding indication contains a parameter identifying a group of contexts (each of which can be e.g., a resource context or a session context).

Here, a "resource context" refers to a resource created and/or hosted in an NF service producer, and a "session context" is created and/or maintained by an NF service consumer for notification/callback corresponding to a resource context in an NF service producer.

In an example, the first binding indication may be at least one of a 3gpp-Sbi-Binding header, 3gpp-Sbi-Routing-Binding header, and a header dedicated for multiple-context operation. The parameter, also referred to as "group parameter" hereinafter, may be carried in a 3gpp-Sbi-Binding header or 3gpp-Sbi-Routing-Binding header, e.g., as a part of the first binding indication. When the parameter is carried in the 3gpp-Sbi-Binding header or 3gpp-Sbi-Routing-Binding header, the message or the first binding indication may further contain an indication that the message is for multiple-context operation. For example, the indication may be a flag which, when set to "true", indicates that the message is for multiple-context operation. Alternatively, the parameter may be carried in a header dedicated for multiple-context operation in the message. The dedicated header may be a new HTTP custom header referred to as e.g., 3gpp-Sbi-Group-Binding. The message may include e.g., a service request, a service response, a subscription request, a subscription response, a notification or callback request, or a notification or callback response.

As used herein, the term "multiple-context operation" refers to an operation that is to be applied to a plurality, or a group, of contexts. The operation may be applied to the group of contexts individually. For example, the operation may include updating binding information for each context in the group or redirecting each context in the group to a different entity (e.g., a different NF instance).

In an example, the group of contexts may be associated with a specific NF service instance, a specific NF service set, or a specific NF instance. That is, a multiple-context operation can be applied to contexts served or hosted by the specific NF service instance, NF service set, or NF instance.

In another example, a plurality of contexts, which may be associated with one or more NF service instances, NF service sets, or NF instances, can be grouped and identified with a group identifier (e.g., a string). That is, a multiple-context operation can be applied to contexts having the same group identifier. In yet another example, the group of contexts may be associated with an apiRoot (or authority) of URI, or a regular expression of URI (e.g., resource URI or notification/callback URI). That is, a multiple-context operation can be applied to contexts having URIs that match the apiRoot or regular expression.

Accordingly, the parameter may include at least one of an NF service instance identifier, an NF service set identifier, or an NF instance identifier identifying an entity where the group of contexts was hosted previously. Alternatively or additionally, the parameter may include a first group identifier, e.g., an old group identifier identifying the group previously. Alternatively or additionally, the parameter may include at least one of an apiRoot or a regular expression that is common to respective previous URIs for the group of contexts. Here, "previously" or "previous" means prior to transmitting the message in the block 110.

In an example, when the parameter includes the first group identifier, the first NF may, e.g., before transmitting the message in the block 110, to the second NF, a request or response associated with at least one of the group of contexts, e.g., in a creation or modification process of the at least one context. The request or response contains a second binding indication associated with the at least one context. The request or response, or the second binding indication, contains the first group identifier.

In an example, the context associated with the first binding indication may belong to the group of contexts. Alternatively, the context may be independent from the group.

In an example, the message or the first binding indication may further contain a second group identifier assigned by the first NF for the group of contexts. This is a "new" group identifier as opposed to the "old" group identifier as described above.

In an example, e.g., before transmitting the message in the block 110, the first NF may retrieve, from an NRF, an NF profile of the second NF. The NF profile may contain an indication of support of multiple-context operation. Alternatively or additionally, the first NF may receive, from the second NF, a request or response containing an indication of support of multiple-context operation. For example, the first NF may transmit the message in the block 110 in response to the second NF supporting multiple-context operation.

Figure 2:
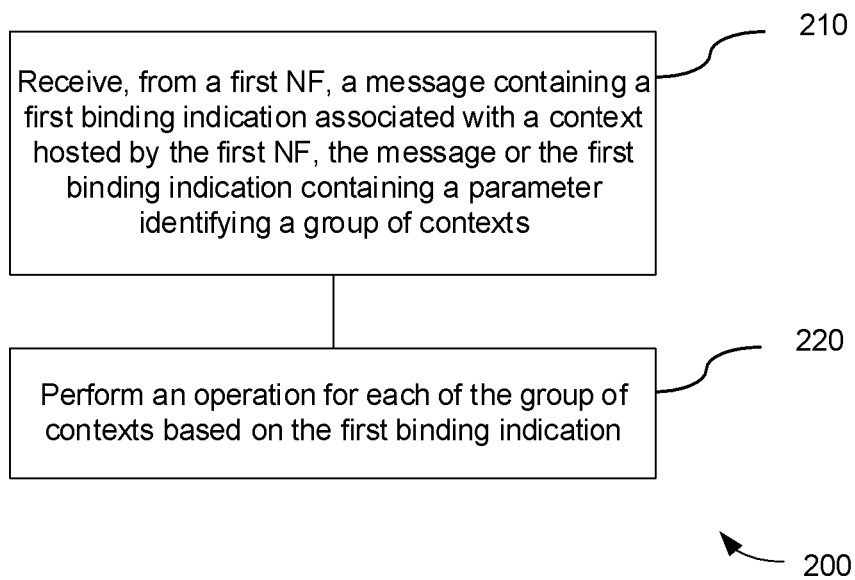
FIG. 2 is a flowchart illustrating a method in an NF according to another embodiment of the present disclosure.

FIG. 2 is a flowchart illustrating a method 200 according to an embodiment of the present disclosure. The method 200 can be performed at a second NF, which can be e.g., an NF service producer or an NF service consumer.

At block 210, a message containing a first binding indication associated with a context (which can be e.g., a resource context or a session context) hosted by a first NF (which can be e.g., an NF service consumer when the second NF is an NF service producer, or an NF service producer when the second NF is an NF service consumer) is received from the first NF. The message or the first binding indication contains a parameter identifying a group of contexts (each of which can be e.g., a resource context or a session context).

In an example, the first binding indication may be at least one of 3gpp-Sbi-Binding header, 3gpp-Sbi-Routing-Binding header, and a header dedicated for multiple-context operation. The parameter may be carried in a 3gpp-Sbi-Binding header or 3gpp-Sbi-Routing-Binding header, e.g., as a part of the first binding indication. When the parameter is carried in the 3gpp-Sbi-Binding header or 3gpp-Sbi-Routing-Binding header, the message or the first binding indication may further contain an indication that the message is for multiple-context operation. For example, the indication may be a flag which, when set to "true", indicates that the message is for multiple-context operation. Alternatively, the parameter may be carried in a header dedicated for multiple-context operation in the message, e.g., 3gpp-Sbi-Group-Binding as described above. The message may include e.g., a service request, a service response, a subscription request, a subscription response, a notification or callback request, or a notification or callback response.

In an example, the parameter may include at least one of an NF service instance identifier, an NF service set identifier, or an NF instance identifier identifying an entity where the group of contexts was hosted previously. Alternatively or additionally, the parameter may include a first group identifier, e.g., an old group identifier identifying the group previously. Alternatively or additionally, the parameter may include at least one of an apiRoot or a regular expression that is common to respective previous URIs for the group of contexts. Here, "previously" or "previous" means prior to receiving the message in the block 210.

In an example, when the parameter includes the first group identifier, the second NF may, e.g., before receiving the message in the block 210, receive, from the first NF or from a third NF, a request or response associated with at least one of the group of contexts, e.g., in a creation or modification process of the at least one context. The request or response contains a second binding indication associated with the at least one context. The request or response, or the second binding indication, contains the first group identifier. Here, the third NF may be an NF where the group of contexts was hosted previously, e.g., when the group of contexts was hosted previously by an NF different from the first NF (e.g., in case of NF instance change).

In an example, the context associated with the first binding indication may belong to the group of contexts. Alternatively, the context may be independent from the group.

In an example, the message or the first binding indication may further contain a second group identifier assigned by the first NF for the group of contexts. This is a "new" group identifier as opposed to the "old" group identifier as described above.

In an example, e.g., before receiving the message in the block 210, the second NF may register, in an NRF, an NF profile containing an indication of support of multiple-context operation. Alternatively or additionally, the second NF may transmit, to the first NF, a request or response containing an indication of support of multiple-context operation.

At block 220, an operation is performed for each of the group of contexts based on the first binding indication.

In an example, the operation performed in the block 220 may include updating binding information for each of the group of contexts based on the first binding indication.

In an example, the first binding indication contains a first binding entity corresponding to a binding level. When the binding entity is changed from a second binding entity corresponding to the binding level in the binding information for any one of the group of contexts prior to the updating, the operation performed in the block 220 may further include: determining a binding entity change associated with the one context, and redirecting the one context to the first binding entity. In particular, the operation of redirecting may include: replacing a URI for the one context based on an apiRoot of the first binding entity. For example, the second NF can derive a new URI (e.g., resource URI for addressing a resource context or notification/callback URI for addressing a session context) by substituting an apiRoot of an old URI with the apiRoot of the first binding entity.

Figure 3:
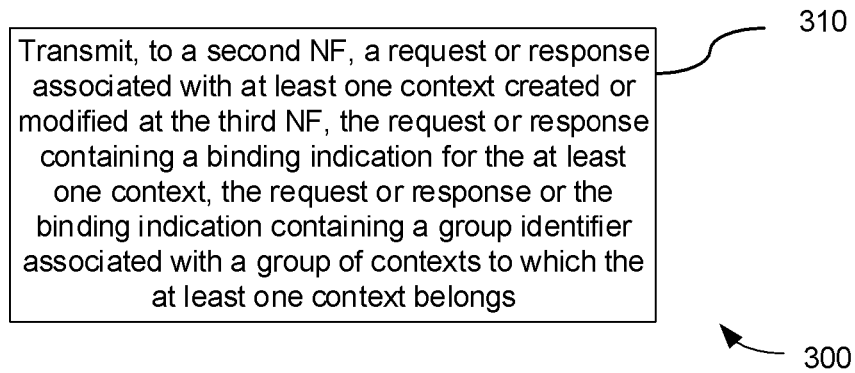
FIG. 3 is a flowchart illustrating a method in an NF according to yet another embodiment of the present disclosure.

FIG. 3 is a flowchart illustrating a method 300 according to an embodiment of the present disclosure. The method 300 can be performed at a third NF, which can be e.g., an NF service producer or an NF service consumer.

At block 310, a request or response associated with at least one context (which can be e.g., a resource context or a session context) created or modified at the third NF is transmitted to a second NF (which can be e.g., an NF service consumer when the third NF is an NF service producer, or an NF service producer when the third NF is an NF service consumer). The request or response contains a binding indication for the at least one context. The request or response or the binding indication contains a group identifier associated with a group of contexts (each of which can be e.g., a resource context or a session context) to which the at least one context belongs.

In an example, e.g., before or after the block 310, the third NF may retrieve, from an NRF, an NF profile of the second NF. The NF profile may contain an indication of support of multiple-context operation. Alternatively or additionally, the third NF may receive, from the second NF, a request or response containing an indication of support of multiple-context operation.

The above methods 100~300 will be further explained with reference to FIGS. 4 and 5.

Figure 4:
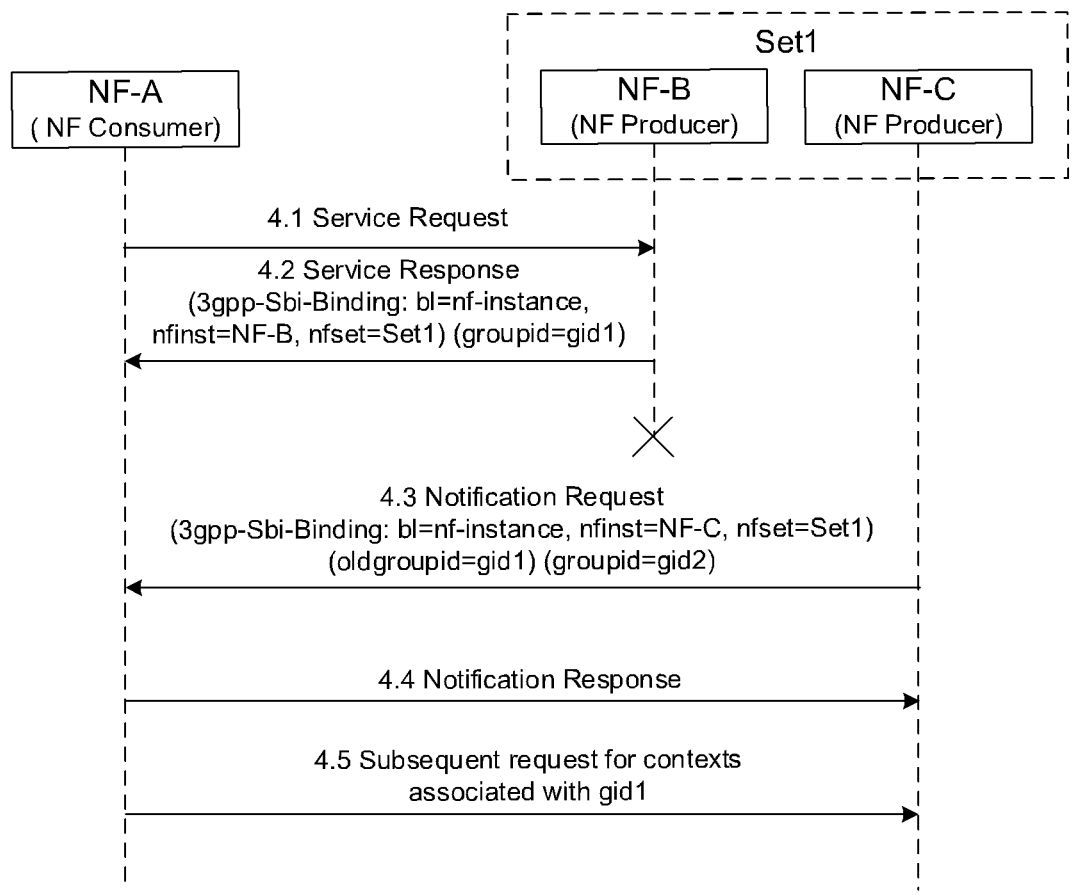
FIG. 4 is a sequence diagram showing an exemplary process for multiple-context operation according to an embodiment of the present disclosure.

FIG. 4 is a sequence diagram showing an exemplary process for multiple-context operation in case of NF producer change according to an embodiment of the present disclosure. As shown, at 4.1, NF-A (corresponding to the above second NF in the methods 100~300) as an NF consumer transmits a service request to NF-B (corresponding to the above third NF in the methods 200~300) as an NF producer. At 4.2, NF-B transmits a service response to NF-A. The service response contains a binding indication for a resource context created at NF-B, with bl=nf-instance, nfinst=NF-B, and nfset=Set1. The service response, or the binding indication, also contains a group identifier, groupid=gid1, assigned by NF-B for a group of contexts to which the resource context belongs. It is to be noted here that the group of contexts to which the resource context belongs may alternatively be identified by e.g., the NF instance ID (NF-B) when contexts hosted by NF-B are considered as a group, and in this case the group identifier can be omitted from the service response or the binding indication.

Then, NF-B fails and NF-C (corresponding to the above first NF in the methods 100~300), which belongs to the same NF set "Set1", takes over all the resource contexts in the group "gid1". At 4.3, NF-C transmits a notification request to NF-A. The notification request contains a binding indication for a resource context (which may or may not be a context in the group "gid1"), with bl=nf-instance, nfinst=NF-C, and nfset=Set1. The notification request, or the binding indication, contains a group parameter, i.e., oldgroupid=gid1 (corresponding to the above first group identifier in the methods 100~200), indicating that the binding indication, or a multiple-context operation based on the binding indication, is to be applied to each context previously belonging to the group "gid1". The notification request, or the binding indication, may optionally contain a new group identifier, groupid=gid2 (corresponding to the above second group identifier in the methods 100~200), that is assigned by NF-C for the group. The new group may for example be obtained by merging the contexts in the group "gid1" into the group "gid2" hosted or served by NF-C. Upon receiving the notification request, NF-A stores the binding indication in the notification request, and optionally updates the group identifier associated with each of the group of contexts with "gid2" if the new group identifier is provided.

It is to be noted here that when the group of contexts is identified by e.g., the NF instance ID (NF-B) instead of the group identifier "gid1" as described above, the group parameter "oldgroupid=gid1" can be omitted from the notification request or the binding indication at 4.3. In this case, the notification request or the binding indication at 4.3 may further contain an indication or flag indicating that it is for multiple-context operation.

In the notification request at 4.3, the binding entity corresponding to the binding level (NF Instance) is changed from NF-B to NF-C when compared with the service response at 4.2. Thus, NF-A becomes aware of an NF producer change and determines that such change is to be applied to each of the group of contexts. For example, NF-A can update binding information for each of the group of contexts based on the binding indication in the notification request, and redirect each of the group of contexts to NF-C.

At 4.4, NF-A transmits to NF-B a notification response for the particular resource context the notification request at 4.3 is intended for. At 4.5, subsequent requests for the contexts in the group "gid1" will be transmitted to NF-C.

It is to be noted that NF-B is optional, or in other words may be the same as NF-C when the group of contexts is switched from one NF service instance (or one NF service set) to another within the same NF instance.

Figure 5:
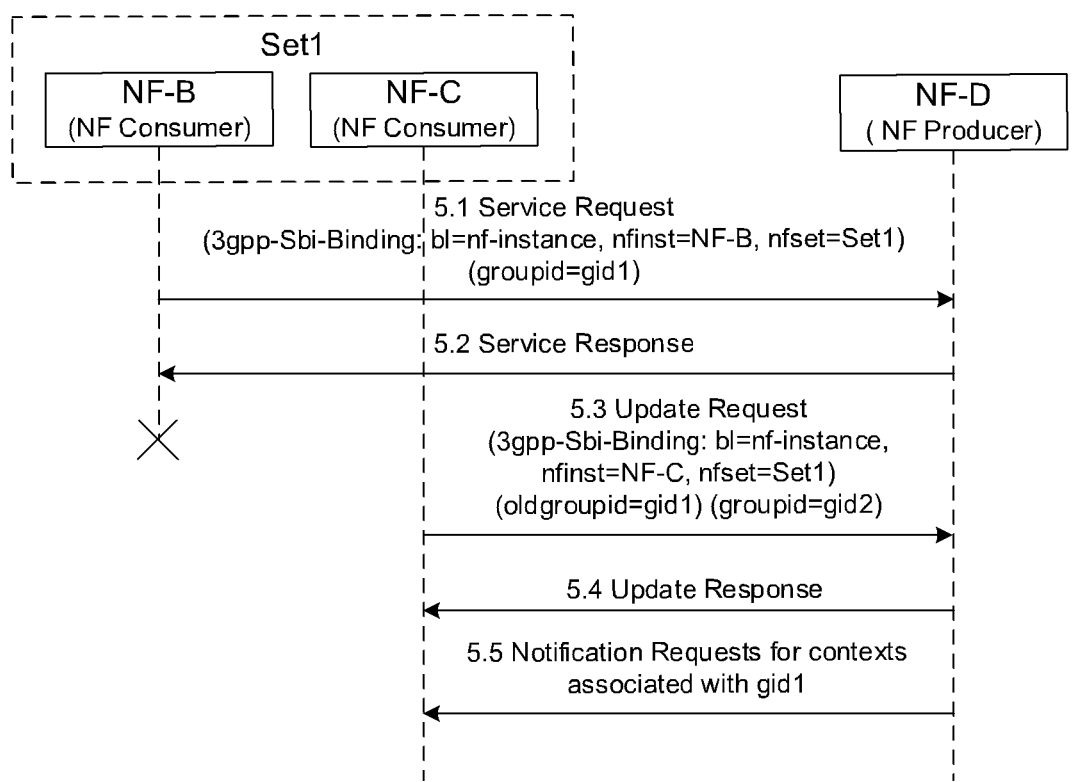
FIG. 5 is a sequence diagram showing an exemplary process for multiple-context operation according to another embodiment of the present disclosure.

FIG. 5 is a sequence diagram showing an exemplary process for multiple-context operation in case of NF consumer change according to an embodiment of the present disclosure. As shown, at 5.1, NF-B (corresponding to the above third NF in the methods 200~300) as an NF consumer transmits a service request to NF-D (corresponding to the above second NF in the methods 100~300) as an NF producer. The service request contains a binding indication for a resource context created at NF-B, with bl=nf-instance, nfinst=NF-B, and nfset=Set1. The service response, or the binding indication, also contains a group identifier, groupid=gid1, assigned by NF-B for a group of contexts to which the resource context belongs. It is to be noted here that the group of contexts to which the resource context belongs may alternatively be identified by e.g., the NF instance ID (NF-B) when contexts hosted by NF-B are considered as a group, and in this case the group identifier can be omitted from the service response or the binding indication. At 5.2, NF-D transmits a service response to NF-B.

Then, NF-B fails and NF-C (corresponding to the above first NF in the methods 100~300), which belongs to the same NF set "Set1", takes over all the resource contexts in the group "gid1". At 5.3, NF-C transmits an update request to NF-D. The update request contains a binding indication for a resource context (which may or may not be a context in the group "gid1"), with bl=nf-instance, nfinst=NF-C, and nfset=Set1. The update request, or the binding indication, contains a group parameter, i.e., oldgroupid=gid1 (corresponding to the above first group identifier in the methods 100~200), indicating that the binding indication, or a multiple-context operation based on the binding indication, is to be applied to each context previously belonging to the group "gid1". The update request, or the binding indication, may optionally contain a new group identifier, groupid=gid2 (corresponding to the above second group identifier in the methods 100~200), that is assigned by NF-C for the group. The new group may for example be obtained by merging the contexts in the group "gid1" into the group "gid2" hosted or served by NF-C. Upon receiving the update request, NF-D stores the binding indication in the update request, and optionally updates the group identifier associated with each of the group of contexts with "gid2" if the new group identifier is provided.

It is to be noted here that when the group of contexts is identified by e.g., the NF instance ID (NF-B) instead of the group identifier "gid1" as described above, the group parameter "oldgroupid=gid1" can be omitted from the update request or the binding indication at 5.3. In this case, the update request or the binding indication at 5.3 may further contain an indication or flag indicating that it is for multiple-context operation.

In the update request at 5.3, the binding entity corresponding to the binding level (NF Instance) is changed from NF-B to NF-C when compared with the service request at 5.1. Thus, NF-D becomes aware of an NF producer change and determines that such change is to be applied to each of the group of contexts. For example, NF-D can update binding information for each of the group of contexts based on the binding indication in the update request, and redirect each of the group of contexts to NF-C.

At 5.4, NF-C transmits to NF-D an update response for the particular resource context the update request at 5.3 is intended for. At 5.5, notification requests for the contexts in the group "gid1" will be transmitted to NF-C.

It is to be noted that NF-B is optional, or in other words may be the same as NF-C when the group of contexts is switched from one NF service instance (or one NF service set) to another within the same NF instance.

Figure 6:
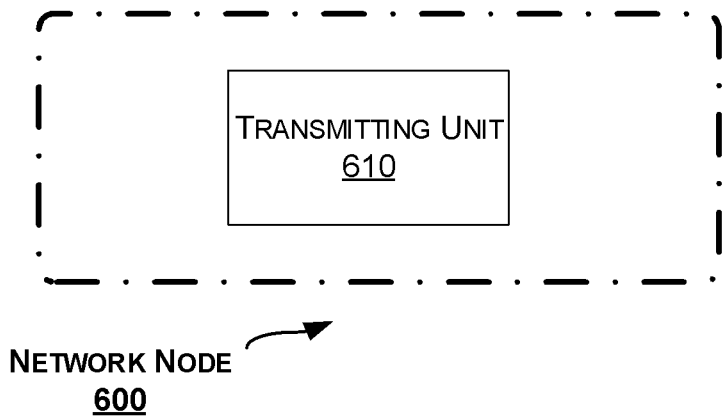
FIG. 6 is a block diagram of a network node according to an embodiment of the present disclosure.

Correspondingly to the method 100 as described above, a network node is provided. FIG. 6 is a block diagram of a network node 600 according to an embodiment of the present disclosure. The network node 600 can be configured to implement a first NF.

As shown in FIG. 6, the network node 600 includes a transmitting unit 610 configured to transmit, to a second NF, a message containing a first binding indication associated with a context hosted by the first NF. The message or the first binding indication contains a parameter identifying a group of contexts.

In an embodiment, the first binding indication may be at least one of a 3gpp-Sbi-Binding header, 3gpp-Sbi-Routing-Binding header, and a header dedicated for multiple-context operation.

In an embodiment, the message or the first binding indication may further contain an indication that the message is for multiple-context operation when the parameter is carried in the 3gpp-Sbi-Binding header or the 3gpp-Sbi-Routing-Binding header.

In an embodiment, the message may include a service request, a service response, a subscription request, a subscription response, a notification or callback request, or a notification or callback response.

In an embodiment, the parameter may include at least one of: an NF service instance identifier, an NF service set identifier, or an NF instance identifier identifying an entity where the group of contexts was hosted previously, a first group identifier, or an apiRoot or a regular expression that is common to respective previous URIs for the group of contexts.

In an embodiment, when the parameter includes the first group identifier, the transmitting unit 610 may be further configured to transmit, prior to transmitting the message containing the first binding indication, to the second NF, a request or response associated with at least one of the group of contexts, the request or response containing a second binding indication associated with the at least one context, the request or response or the second binding indication containing the first group identifier.

In an embodiment, the context may belong to the group of contexts.

In an embodiment, the message or the first binding indication may further contain a second group identifier assigned by the first NF for the group of contexts.

In an embodiment, the network node 600 may further include a retrieving unit configured to retrieve, from an NRF, an NF profile of the second NF, the NF profile containing an indication of support of multiple-context operation. Alternatively, the network node 600 may further include a receiving unit configured to receive, from the second NF, a request or response containing an indication of support of multiple-context operation.

In an embodiment, each of the group of contexts may include a resource context or a session context.

In an embodiment, the first NF may be an NF service producer and the second NF may be an NF service consumer, or the first NF may be an NF service consumer and the second NF may be an NF service producer.

The unit 610 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 1.

Figure 7:
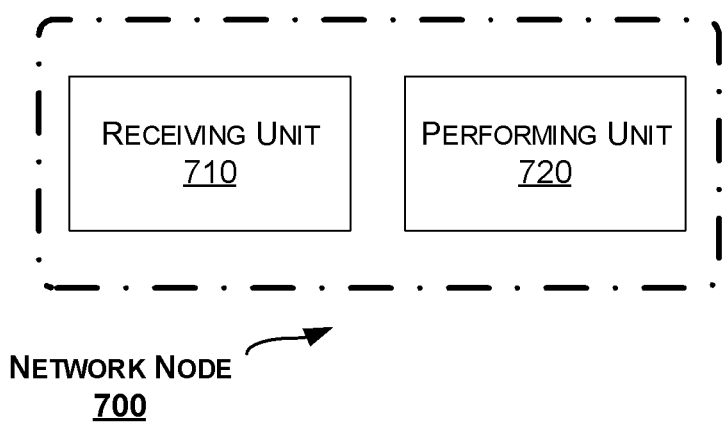
FIG. 7 is a block diagram of a network node according to another embodiment of the present disclosure.

Correspondingly to the method 200 as described above, a network node is provided. FIG. 7 is a block diagram of a network node 700 according to an embodiment of the present disclosure. The network node 700 can be configured to implement a second NF.

As shown in FIG. 7, the network node 700 includes a receiving unit 710 configured to receive, from a first NF, a message containing a first binding indication associated with a context hosted by the first NF, the message or the first binding indication containing a parameter identifying a group of contexts. The network node 700 further includes a performing unit 720 configured to perform an operation for each of the group of contexts based on the first binding indication.

In an embodiment, the first binding indication may be at least one of a 3gpp-Sbi-Binding header, 3gpp-Sbi-Routing-Binding header, and a header dedicated for multiple-context operation.

In an embodiment, the message or the first binding indication may further contain an indication that the message is for multiple-context operation when the parameter is carried in the 3gpp-Sbi-Binding header or the 3gpp-Sbi-Routing-Binding header.

In an embodiment, the message may include a service request, a service response, a subscription request, a subscription response, a notification or callback request, or a notification or callback response.

In an embodiment, the parameter may include at least one of: an NF service instance identifier, an NF service set identifier, or an NF instance identifier identifying an entity where the group of contexts was hosted previously, a first group identifier, or an apiRoot or a regular expression that is common to respective previous URIs for the group of contexts.

In an embodiment, when the parameter includes the first group identifier, the receiving unit 720 may be further configured to, prior to receiving the message containing the first binding indication, receive, from the first NF or from a third NF, a request or response associated with at least one of the group of contexts, the request or response containing a second binding indication associated with the at least one context, the request or response or the second binding indication containing the first group identifier.

In an embodiment, the context may belong to the group of contexts.

In an embodiment, the message or the first binding indication may further contain a group identifier assigned by the first NF for the group of contexts.

In an embodiment, the network node 700 may further include a registering unit configured to register, in an NRF, an NF profile containing an indication of support of multiple-context operation. Alternatively, the network node 700 may further include a transmitting unit configured to transmit, to the first NF, a request or response containing an indication of support of multiple-context operation.

In an embodiment, the performing unit 720 may be configured to update binding information for each of the group of contexts based on the first binding indication.

In an embodiment, the first binding indication may contain a first binding entity corresponding to a binding level, and the performing unit 720 may be further configured to, when the binding entity is changed from a second binding entity corresponding to the binding level in the binding information for any one of the group of contexts prior to updating: determine a binding entity change associated with the one context; and redirect the one context to the first binding entity.

In an embodiment, the operation of redirecting may include: replacing a URI for the one context based on an apiRoot of the first binding entity.

In an embodiment, each of the group of contexts may include a resource context or a session context.

In an embodiment, the first NF may be an NF service producer and the second NF may be an NF service consumer, or the first NF may be an NF service consumer and the second NF may be an NF service producer.

The units 710 and 720 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 2.

Figure 8:
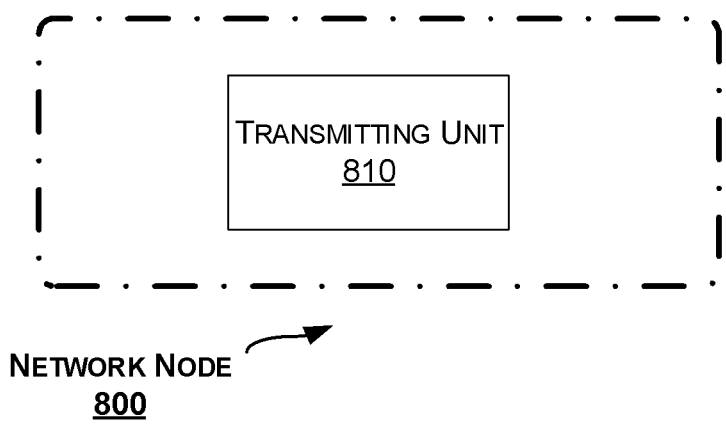
FIG. 8 is a block diagram of a network node according to yet another embodiment of the present disclosure.

Correspondingly to the method 300 as described above, a network node is provided. FIG. 8 is a block diagram of a network node 800 according to an embodiment of the present disclosure. The network node 800 can be configured to implement a third NF.

As shown in FIG. 8, the network node 800 includes a transmitting unit 810 configured to transmit, to a second NF, a request or response associated with at least one context created or modified at the third NF. The request or response contains a binding indication for the at least one context. The request or response or the binding indication contains a group identifier associated with a group of contexts to which the at least one context belongs.

In an embodiment, the network node 800 may further include a retrieving unit configured to retrieve, from an NRF, an NF profile of the second NF, the NF profile containing an indication of support of multiple-context operation. Alternatively, the network node 800 may further include a receiving unit configured to receive, from the second NF, a request or response containing an indication of support of multiple-context operation.

In an embodiment, each of the group of contexts may include a resource context or a session context.

In an embodiment, the third NF may be an NF service producer and the second NF may be an NF service consumer, or the third NF may be an NF service consumer and the second NF may be an NF service producer.

The unit 810 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 3.

Figure 9:
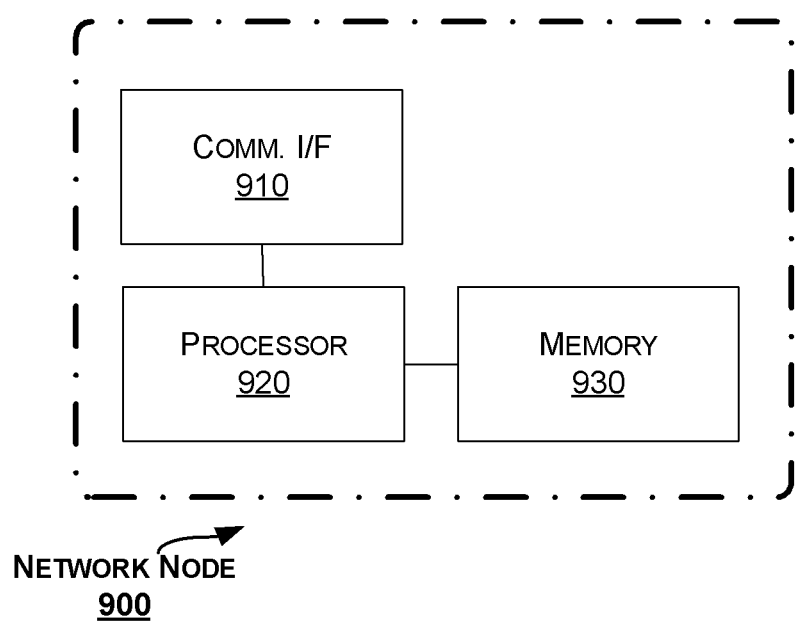
FIG. 9 is a block diagram of a network node according to still another embodiment of the present disclosure.

FIG. 9 is a block diagram of a network node 900 according to another embodiment of the present disclosure.

The network node 900 includes a communication interface 910, a processor 920 and a memory 930.

The memory 930 may contain instructions executable by the processor 920 whereby the network node 900 is operative to, when implementing a first NF, perform the actions, e.g., of the procedure described earlier in conjunction with FIG. 1. Particularly, the memory 930 may contain instructions executable by the processor 900 whereby the network node 900 is operative to, when implementing a first NF: transmit, to a second NF, a message containing a first binding indication associated with a context hosted by the first NF. The message or the first binding indication contains a parameter identifying a group of contexts.

In an embodiment, the first binding indication may be at least one of a 3gpp-Sbi-Binding header, 3gpp-Sbi-Routing-Binding header, and a header dedicated for multiple-context operation.

In an embodiment, the message or the first binding indication may further contain an indication that the message is for multiple-context operation when the parameter is carried in the 3gpp-Sbi-Binding header or the 3gpp-Sbi-Routing-Binding header.

In an embodiment, the message may include a service request, a service response, a subscription request, a subscription response, a notification or callback request, or a notification or callback response.

In an embodiment, the parameter may include at least one of: an NF service instance identifier, an NF service set identifier, or an NF instance identifier identifying an entity where the group of contexts was hosted previously, a first group identifier, or an apiRoot or a regular expression that is common to respective previous URIs for the group of contexts.

In an embodiment, when the parameter includes the first group identifier, the memory 930 may further contain instructions executable by the processor 900 whereby the network node 900 is operative to, when implementing the first NF: prior to transmitting the message containing the first binding indication, transmit, to the second NF, a request or response associated with at least one of the group of contexts, the request or response containing a second binding indication associated with the at least one context, the request or response or the second binding indication containing the first group identifier.

In an embodiment, the context may belong to the group of contexts.

In an embodiment, the message or the first binding indication may further contain a second group identifier assigned by the first NF for the group of contexts.

In an embodiment, the memory 930 may further contain instructions executable by the processor 900 whereby the network node 900 is operative to, when implementing the first NF: retrieve, from an NRF, an NF profile of the second NF, the NF profile containing an indication of support of multiple-context operation; or receive, from the second NF, a request or response containing an indication of support of multiple-context operation.

In an embodiment, each of the group of contexts may include a resource context or a session context.

In an embodiment, the first NF may be an NF service producer and the second NF may be an NF service consumer, or the first NF may be an NF service consumer and the second NF may be an NF service producer.

Alternatively, the memory 930 may contain instructions executable by the processor 920 whereby the network node 900 is operative to, when implementing a second NF, perform the actions, e.g., of the procedure described earlier in conjunction with FIG. 2. Particularly, the memory 930 may contain instructions executable by the processor 900 whereby the network node 900 is operative to, when implementing a second NF: receive, from a first NF, a message containing a first binding indication associated with a context hosted by the first NF, the message or the first binding indication containing a parameter identifying a group of contexts; and perform an operation for each of the group of contexts based on the first binding indication.

In an embodiment, the first binding indication may be at least one of 3gpp-Sbi-Binding header, 3gpp-Sbi-Routing-Binding header, and a header dedicated for multiple-context operation.

In an embodiment, the message or the first binding indication may further contain an indication that the message is for multiple-context operation when the parameter is carried in the 3gpp-Sbi-Binding header or the 3gpp-Sbi-Routing-Binding header.

In an embodiment, the message may include a service request, a service response, a subscription request, a subscription response, a notification or callback request, or a notification or callback response.

In an embodiment, the parameter may include at least one of: an NF service instance identifier, an NF service set identifier, or an NF instance identifier identifying an entity where the group of contexts was hosted previously, a first group identifier, or an apiRoot or a regular expression that is common to respective previous URIs for the group of contexts.

In an embodiment, when the parameter includes the first group identifier, the memory 930 may further contain instructions executable by the processor 900 whereby the network node 900 is operative to, when implementing the second NF: prior to receiving the message containing the first binding indication, receive, from the first NF or from a third NF, a request or response associated with at least one of the group of contexts, the request or response containing a second binding indication associated with the at least one context, the request or response or the second binding indication containing the group identifier.

In an embodiment, the context may belong to the group of contexts.

In an embodiment, the message or the first binding indication may further contain a second group identifier assigned by the first NF for the group of contexts.

In an embodiment, the memory 930 may further contain instructions executable by the processor 900 whereby the network node 900 is operative to, when implementing the second NF: register, in an NRF, an NF profile containing an indication of support of multiple-context operation; or transmit, to the first NF, a request or response containing an indication of support of multiple-context operation.

In an embodiment, the operation of performing may include: updating binding information for each of the group of contexts based on the first binding indication.

In an embodiment, the first binding indication may contain a first binding entity corresponding to a binding level, and the operation of performing may further include, when the binding entity is changed from a second binding entity corresponding to the binding level in the binding information for any one of the group of contexts prior to updating: determining a binding entity change associated with the one context; and redirecting the one context to the first binding entity.

In an embodiment, the operation of redirecting may include: replacing a URI for the one context based on an apiRoot of the first binding entity.

In an embodiment, each of the group of contexts may include a resource context or a session context.

In an embodiment, the first NF may be an NF service producer and the second NF may be an NF service consumer, or the first NF may be an NF service consumer and the second NF may be an NF service producer.

Alternatively, the memory 930 may contain instructions executable by the processor 920 whereby the network node 900 is operative to, when implementing a third NF, perform the actions, e.g., of the procedure described earlier in conjunction with FIG. 3. Particularly, the memory 930 may contain instructions executable by the processor 900 whereby the network node 900 is operative to, when implementing a third NF: transmit, to a second NF, a request or response associated with at least one context created or modified at the third NF. The request or response contains a binding indication for the at least one context. The request or response or the binding indication contains a group identifier associated with a group of contexts to which the at least one context belongs.

In an embodiment, the memory 930 may further contain instructions executable by the processor 900 whereby the network node 900 is operative to, when implementing the third NF: retrieve, from an NRF, an NF profile of the second NF, the NF profile containing an indication of support of multiple-context operation; or receive, from the second NF, a request or response containing an indication of support of multiple-context operation.

In an embodiment, each of the group of contexts may include a resource context or a session context.

In an embodiment, the third NF may be an NF service producer and the second NF may be an NF service consumer, or the third NF may be an NF service consumer and the second NF may be an NF service producer.

The present disclosure also provides at least one computer program product in the form of a non-volatile or volatile memory, e.g., a non-transitory computer readable storage medium, an Electrically Erasable Programmable Read-Only Memory (EEPROM), a flash memory and a hard drive. The computer program product includes a computer program. The computer program includes: code/computer readable instructions, which when executed by the processor 920 causes the network node 900 to perform the actions, e.g., of the procedure described earlier in conjunction with FIG. 1, 2, or 3.

The computer program product may be configured as a computer program code structured in computer program modules. The computer program modules could essentially perform the actions of the flow illustrated in FIG. 1, 2, or 3.

The processor may be a single CPU (Central Processing Unit), but could also comprise two or more processing units. For example, the processor may include general purpose microprocessors; instruction set processors and/or related chips sets and/or special purpose microprocessors such as Application Specific Integrated Circuits (ASICs). The processor may also comprise board memory for caching purposes. The computer program may be carried in a computer program product connected to the processor. The computer program product may comprise a non-transitory computer readable storage medium on which the computer program is stored. For example, the computer program product may be a flash memory, a Random Access Memory (RAM), a Read-Only Memory (ROM), or an EEPROM, and the computer program modules described above could in alternative embodiments be distributed on different computer program products in the form of memories.

Figure 10:
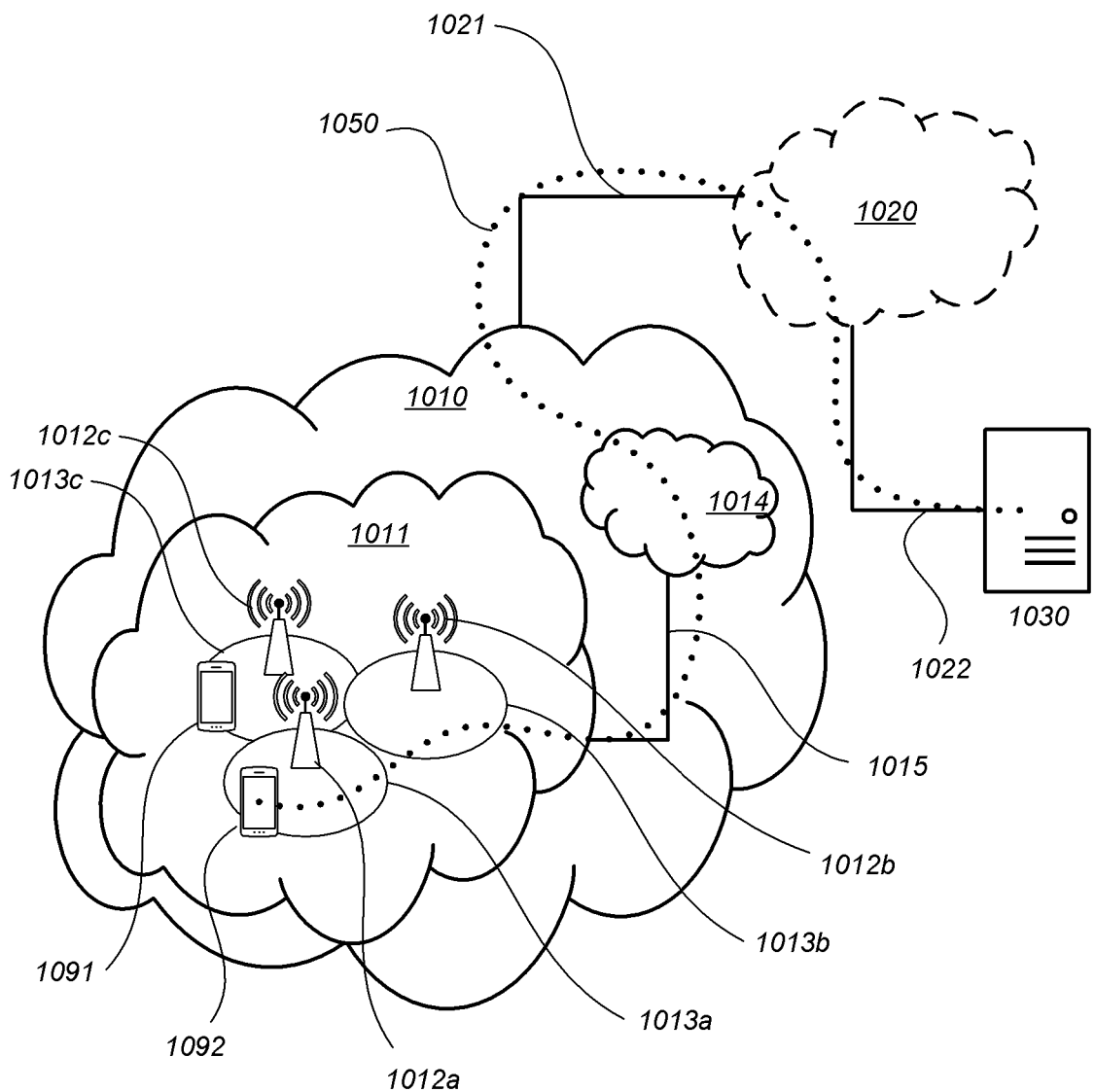
FIG. 10 schematically illustrates a telecommunication network connected via an intermediate network to a host computer.

With reference to FIG. 10, in accordance with an embodiment, a communication system includes a telecommunication network 1010, such as a 3GPP-type cellular network, which comprises an access network 1011, such as a radio access network, and a core network 1014. The access network 1011 comprises a plurality of base stations 1012a, 1012b, 1012c, such as NBs, eNBs, gNBs or other types of wireless access points, each defining a corresponding coverage area 1013a, 1013b, 1013c. Each base station 1012a, 1012b, 1012c is connectable to the core network 1014 over a wired or wireless connection 1015. A first user equipment (UE) 1091 located in coverage area 1013c is configured to wirelessly connect to, or be paged by, the corresponding base station 1012c. A second UE 1092 in coverage area 1013a is wirelessly connectable to the corresponding base station 1012a. While a plurality of UEs 1091, 1092 are illustrated in this example, the disclosed embodiments are equally applicable to a situation where a sole UE is in the coverage area or where a sole UE is connecting to the corresponding base station 1012.

The telecommunication network 1010 is itself connected to a host computer 1030, which may be embodied in the hardware and/or software of a standalone server, a cloud-implemented server, a distributed server or as processing resources in a server farm. The host computer 1030 may be under the ownership or control of a service provider, or may be operated by the service provider or on behalf of the service provider. The connections 1021, 1022 between the telecommunication network 1010 and the host computer 1030 may extend directly from the core network 1014 to the host computer 1030 or may go via an optional intermediate network 1020. The intermediate network 1020 may be one of, or a combination of more than one of, a public, private or hosted network; the intermediate network 1020, if any, may be a backbone network or the Internet, in particular, the intermediate network 1020 may comprise two or more sub-networks (not shown).

The communication system of FIG. 10 as a whole enables connectivity between one of the connected UEs 1091, 1092 and the host computer 1030. The connectivity may be described as an over-the-top (OTT) connection 1050. The host computer 1030 and the connected UEs 1091, 1092 are configured to communicate data and/or signaling via the OTT connection 1050, using the access network 1011, the core network 1014, any intermediate network 1020 and possible further infrastructure (not shown) as intermediaries.

The OTT connection 1050 may be transparent in the sense that the participating communication devices through which the OTT connection 1050 passes are unaware of routing of uplink and downlink communications. For example, a base station 1012 may not or need not be informed about the past routing of an incoming downlink communication with data originating from a host computer 1030 to be forwarded (e.g., handed over) to a connected UE 1091. Similarly, the base station 1012 need not be aware of the future routing of an outgoing uplink communication originating from the UE 1091 towards the host computer 1030.

Example implementations, in accordance with an embodiment, of the UE, base station and host computer discussed in the preceding paragraphs will now be described with reference to FIG. 11. In a communication system 1100, a host computer 1110 comprises hardware 1115 including a communication interface 1116 configured to set up and maintain a wired or wireless connection with an interface of a different communication device of the communication system 1100. The host computer 1110 further comprises processing circuitry 1118, which may have storage and/or processing capabilities. In particular, the processing circuitry 1118 may comprise one or more programmable processors, application-specific integrated circuits, field programmable gate arrays or combinations of these (not shown) adapted to execute instructions. The host computer 1110 further comprises software 1111, which is stored in or accessible by the host computer 1110 and executable by the processing circuitry 1118. The software 1111 includes a host application 1112. The host application 1112 may be operable to provide a service to a remote user, such as a UE 1130 connecting via an OTT connection 1150 terminating at the UE 1130 and the host computer 1110. In providing the service to the remote user, the host application 1112 may provide user data which is transmitted using the OTT connection 1150.

The communication system 1100 further includes a base station 1120 provided in a telecommunication system and comprising hardware 1125 enabling it to communicate with the host computer 1110 and with the UE 1130. The hardware 1125 may include a communication interface 1126 for setting up and maintaining a wired or wireless connection with an interface of a different communication device of the communication system 1100, as well as a radio interface 1127 for setting up and maintaining at least a wireless connection 1170 with a UE 1130 located in a coverage area (not shown in FIG. 11) served by the base station 1120. The communication interface 1126 may be configured to facilitate a connection 1160 to the host computer 1110. The connection 1160 may be direct or it may pass through a core network (not shown in FIG. 11) of the telecommunication system and/or through one or more intermediate networks outside the telecommunication system. In the embodiment shown, the hardware 1125 of the base station 1120 further includes processing circuitry 1128, which may comprise one or more programmable processors, application-specific integrated circuits, field programmable gate arrays or combinations of these (not shown) adapted to execute instructions. The base station 1120 further has software 1121 stored internally or accessible via an external connection.

The communication system 1100 further includes the UE 1130 already referred to. Its hardware 1135 may include a radio interface 1137 configured to set up and maintain a wireless connection 1170 with a base station serving a coverage area in which the UE 1130 is currently located. The hardware 1135 of the UE 1130 further includes processing circuitry 1138, which may comprise one or more programmable processors, application-specific integrated circuits, field programmable gate arrays or combinations of these (not shown) adapted to execute instructions. The UE 1130 further comprises software 1131, which is stored in or accessible by the UE 1130 and executable by the processing circuitry 1138. The software 1131 includes a client application 1132. The client application 1132 may be operable to provide a service to a human or non-human user via the UE 1130, with the support of the host computer 1110. In the host computer 1110, an executing host application 1112 may communicate with the executing client application 1132 via the OTT connection 1150 terminating at the UE 1130 and the host computer 1110. In providing the service to the user, the client application 1132 may receive request data from the host application 1112 and provide user data in response to the request data. The OTT connection 1150 may transfer both the request data and the user data. The client application 1132 may interact with the user to generate the user data that it provides.

Figure 11:
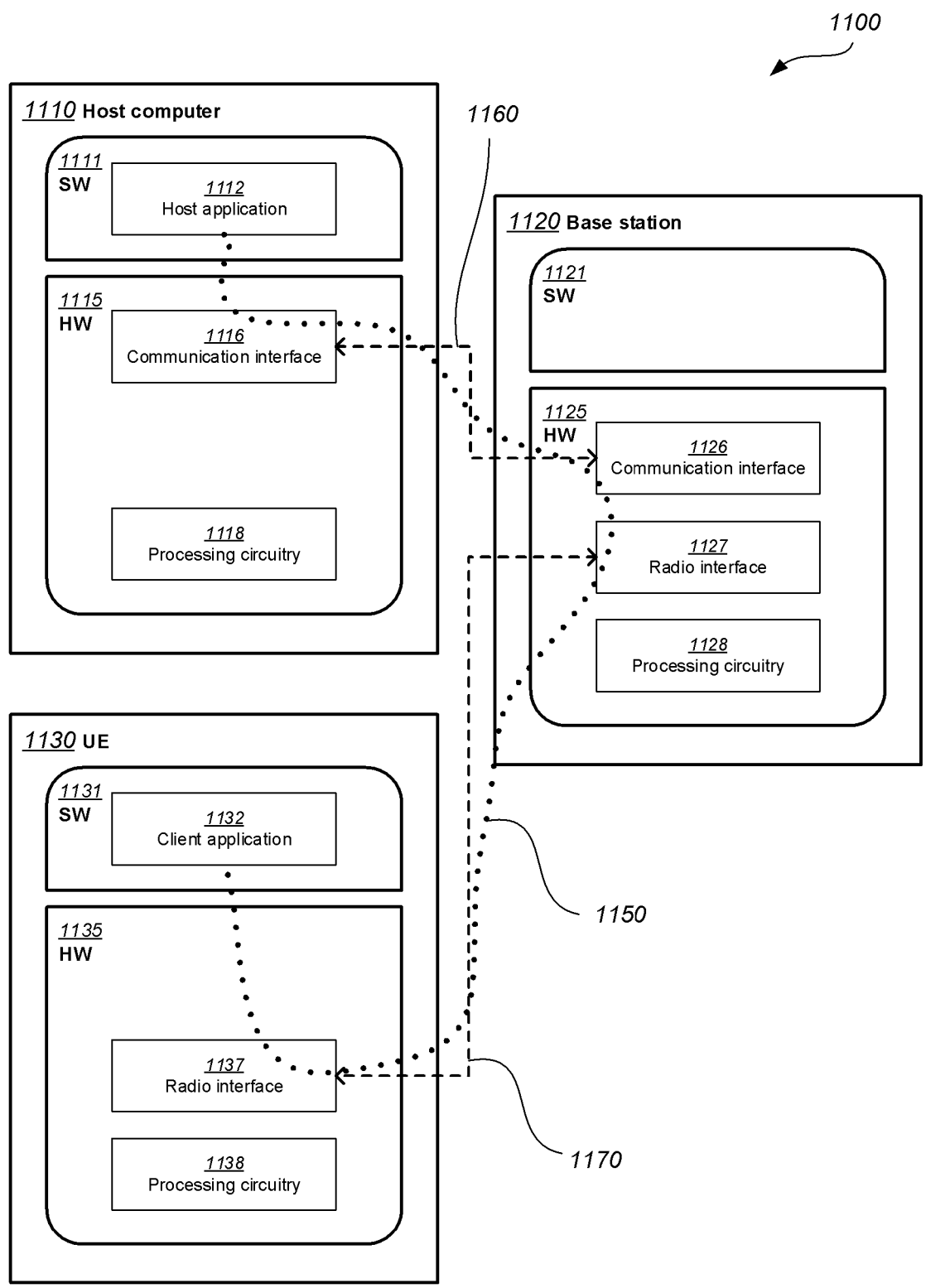
FIG. 11 is a generalized block diagram of a host computer communicating via a base station with a user equipment over a partially wireless connection.

It is noted that the host computer 1110, base station 1120 and UE 1130 illustrated in FIG. 11 may be identical to the host computer 1030, one of the base stations 1012a, 1012b, 1012c and one of the UEs 1091, 1092 of FIG. 10, respectively. This is to say, the inner workings of these entities may be as shown in FIG. 11 and independently, the surrounding network topology may be that of FIG. 10.

In FIG. 11, the OTT connection 1150 has been drawn abstractly to illustrate the communication between the host computer 1110 and the use equipment 1130 via the base station 1120, without explicit reference to any intermediary devices and the precise routing of messages via these devices. Network infrastructure may determine the routing, which it may be configured to hide from the UE 1130 or from the service provider operating the host computer 1110, or both. While the OTT connection 1150 is active, the network infrastructure may further take decisions by which it dynamically changes the routing (e.g., on the basis of load balancing consideration or reconfiguration of the network).

The wireless connection 1170 between the UE 1130 and the base station 1120 is in accordance with the teachings of the embodiments described throughout this disclosure. One or more of the various embodiments improve the performance of OTT services provided to the UE 1130 using the OTT connection 1150, in which the wireless connection 1170 forms the last segment. More precisely, the teachings of these embodiments may improve the latency and efficiency and thereby provide benefits such as reduced user waiting time.

A measurement procedure may be provided for the purpose of monitoring data rate, latency and other factors on which the one or more embodiments improve. There may further be an optional network functionality for reconfiguring the OTT connection 1150 between the host computer 1110 and UE 1130, in response to variations in the measurement results. The measurement procedure and/or the network functionality for reconfiguring the OTT connection 1150 may be implemented in the software 1111 of the host computer 1110 or in the software 1131 of the UE 1130, or both. In embodiments, sensors (not shown) may be deployed in or in association with communication devices through which the OTT connection 1150 passes; the sensors may participate in the measurement procedure by supplying values of the monitored quantities exemplified above, or supplying values of other physical quantities from which software 1111, 1131 may compute or estimate the monitored quantities. The reconfiguring of the OTT connection 1150 may include message format, retransmission settings, preferred routing etc.; the reconfiguring need not affect the base station 1120, and it may be unknown or imperceptible to the base station 1120. Such procedures and functionalities may be known and practiced in the art. In certain embodiments, measurements may involve proprietary UE signaling facilitating the host computer's 1111 measurements of throughput, propagation times, latency and the like. The measurements may be implemented in that the software 1111, 1131 causes messages to be transmitted, in particular empty or 'dummy' messages, using the OTT connection 1150 while it monitors propagation times, errors etc.

FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In a first step 1210 of the method, the host computer provides user data. In an optional substep 1211 of the first step 1210, the host computer provides the user data by executing a host application. In a second step 1220, the host computer initiates a transmission carrying the user data to the UE. In an optional third step 1230, the base station transmits to the UE the user data which was carried in the transmission that the host computer initiated, in accordance with the teachings of the embodiments described throughout this disclosure. In an optional fourth step 1240, the UE executes a client application associated with the host application executed by the host computer.

FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section. In a first step 1310 of the method, the host computer provides user data. In an optional substep (not shown) the host computer provides the user data by executing a host application. In a second step 1320, the host computer initiates a transmission carrying the user data to the UE. The transmission may pass via the base station, in accordance with the teachings of the embodiments described throughout this disclosure. In an optional third step 1330, the UE receives the user data carried in the transmission.

FIG. 14 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 14 will be included in this section. In an optional first step 1410 of the method, the UE receives input data provided by the host computer. Additionally or alternatively, in an optional second step 1420, the UE provides user data. In an optional substep 1421 of the second step 1420, the UE provides the user data by executing a client application. In a further optional substep 1411 of the first step 1410, the UE executes a client application which provides the user data in reaction to the received input data provided by the host computer. In providing the user data, the executed client application may further consider user input received from the user. Regardless of the specific manner in which the user data was provided, the UE initiates, in an optional third substep 1430, transmission of the user data to the host computer. In a fourth step 1440 of the method, the host computer receives the user data transmitted from the UE, in accordance with the teachings of the embodiments described throughout this disclosure.

FIG. 15 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 15 will be included in this section. In an optional first step 1510 of the method, in accordance with the teachings of the embodiments described throughout this disclosure, the base station receives user data from the UE. In an optional second step 1520, the base station initiates transmission of the received user data to the host computer. In a third step 1530, the host computer receives the user data carried in the transmission initiated by the base station.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The present disclosure further comprises the following embodiments based on the 3GPP TS 29.500.
5.2.3.2.6 3gpp-Sbi-Binding This header contains a comma-delimited list of Binding Indications from an HTTP server for storage and subsequent use by an HTTP client (see clause 6.12).

The encoding of the header follows the ABNF as defined in IETF RFC 7230 [12].

3gpp-Sbi-Binding="3gpp-Sbi-Binding" ":" 1 #(OWS "bl=" blvalue 1*(";" OWS parameter) [";" OWS recoverytime] [";" OWS notif-receiver] [";" OWS "group=" groupvalue] [1*(";" OWS groupparameter)])

blvalue="nf-instance"/"nf-set"/"nfservice-instance"/"nfservice-set"

parameter=parametername "=" token parametername="nfinst"/"nfset"/"nfservinst"/"nfservice-set"/"servname"/"scope"/"backupamfinst"

recoverytime="recoverytime=" OWS date-time notif-receiver="nr=" URI; URI production rule from IETF RFC 3986 [14], Appendix A groupvalue="true"/"false"

groupparameter=groupparametername "=" token groupparametername="oldgroupid"/"groupid"/"apiroot"

The following parameters are defined:

scope: indicates the applicability of a Binding Indication in a service request. This may take one of the following values:

"other-service": the binding information applies to other service(s) that the NF Service Consumer may later on provide as an NF Service Producer (see clause 6.12.3);

"subscription-events": the binding information applies to subscription change event notifications (see clause 6.12.4);

"callback": the binding information applies to notification or callback requests (see clauses 6.12.4 and 6.12.5).

The absence of this parameter in a Binding Indication in a service request shall be interpreted as "callback".

Two scope parameters may be present in a Binding Indication if the binding information applies to notification/callback requests and to other services.

servname (service name): indicates the name of a service, as defined in 3GPP TS 29.510 [8], or a custom service, i.e.:

the name of the service that handles a notification or a callback request, when present in a Binding Indication for a subscription or a callback, i.e. with a scope parameter absent or set to "callback"; or the name of the other service(s) for which the binding applies, when present in a Binding Indication in a service request for the other services the NF Service Consumer can provide later on as an NF Service Producer, i.e. with the scope parameter set to "other-service". More than one servname parameter may be present to represent multiple such services. The absence of this parameter in a Binding Indication with the scope parameter set to "other-service" shall be interpreted as binding information that applies to all the services that the NF Service Consumer may provide later as an NF Service Producer.

recoverytime: indicates the recovery timestamp of the entity corresponding to the highest resiliency level supported for the resource, that is, the higher level binding entity indicated in the Binding Indication. See Table 6.3.1.0-1 of 3GPP TS 23.501 [3] and clause 6.1 of 3GPP TS 23.527 [38]. The date-time type is specified in IETF RFC 5322 [37] and clause 7.1.1.1 of IETF RFC 7231 [11].

nr: indicates the URI of the notification endpoint when this binding information is applicable; it applies to callback requests (see clause 6.12.4); if the notification URI does not contain a correlationID in the path (i.e. it is a common notification URI for multiple subscriptions), the correlationID shall be added as a fragment component of the URI (i.e. following the "#" character) at the end of the URI.

for the definition and encoding of the blvalue, nfinst, backupamfinst, nfset, nfservinst and nfserviceset see clause 5.2.3.2.5.

group: it is a boolean indicating if the binding indication is for a group of resource/session contexts.

groupid (group id): indicates the group identifier allocated by the NF (service) instance, one ore more resource/session contexts are sharing the same groupid. The groupid is optional and it may be allocated when the resource/session context is created and then be updated afterwards. The groupid is global unique and it may be encoded using the same mechanism for the NfInstanceId as specified in 3GPP TS 29.571 [13].

oldgroupid (old group id): indicates the group identifier allocated by the NF (service) instance previously and to be replaced by the groupid, hence it shall only be present when to update a Binding Indication for multiple texts. When the if the oldgroupid is present, the groupid shall also be present to indicate the new groupid allocated.

apiroot: identify the apiroot in the resource URI or notification/callback URI which is common to multiple contexts. This parameter may only be present when to update a Binding Indication for multiple text and when the "group" is set to "true". When included, it indicates that all resources or notification contexts at this apiRoot will use the updated Binding Indication subsequently. More than one apiroot may be present.

EXAMPLES 1 to 5: Same as EXAMPLES 1 to 5 defined in clause 5.2.3.2.5, with the header name "3gpp-Sbi-Binding" instead of "3gpp-Sbi-Routing-Binding".

EXAMPLE 6: Subscription request from one NF on behalf of another NF, with 2 binding indications:
3gpp-Sbi-Binding: bl=if-set; nfset=set1.udmset.5gc.mnc012.mcc345; servname=nudm-ee;scope=subscription-events
3gpp-Sbi-Binding: bl=if-set; nfset=set1.nefset.5gc.mnc012.mcc345; servname=nnef-event-exposure EXAMPLE 7: Service request with 2 binding indications, for callback requests and for other services the NF Service Consumer may provide later as an NF Service Producer:
3gpp-Sbi-Binding: bl=nf-instance; nfmnst=54804518-4191-46b3-955c-ac631f953ed8; nfset=set1.smfset.5gc.mnc012.mcc345; servname=nsmf-pdusession
3gpp-Sbi-Binding: bl=nf-instance; nfmnst=54804518-4191-46b3-955c-ac631f953ed8; nfset=set1.smfset.5gc.mnc012.mcc345; scope=other-service; servname=nsmf-event-exposure EXAMPLE 8: Service request with one binding indication applying to notification/callback requests and to any other services the NF Service Consumer may provide later as an NF Service Producer:
3gpp-Sbi-Binding: bl=nf-set; nfset=set1.region48.amfset.5gc.mnc012.mcc345; scope=callback; scope=other-service EXAMPLE 9: Service request with one binding indication applying to notification/callback requests together with a recovery time stamp associated with the NF Set indicated in the binding indication and with the binding level set to "nfset":
3gpp-Sbi-Binding: bl=nfset; nfset=set1.region48.amfset.5gc.mnc012.mcc345; scope=callback; recoverytime=Tue, 4 Feb 2020 08:49:37 GMT EXAMPLE 10: Service response with one binding indication applying to the session context with a recovery time stamp associated with the NF Set indicated in "nfset" in the binding indication and with the binding level set to "nfinstance":
3gpp-Sbi-Binding: bl=nfinstance; nfinst=54804518-4191-46b3-955c-ac631f953ed8; nfset=set1.smfset.5gc.mnc012.mcc345; recoverytime=Tue, 4 Feb 2020 08:49:37 GMT EXAMPLE 11: Service response with one binding indication applying to the session context with a recovery time stamp associated with the NF Instance included the binding indication and with the binding level set to nfserviceinstance:
3gpp-Sbi-Binding: bl=nfserviceinstance; nfservinst=xyz; nfinst=54804518-4191-46b3-955c-ac631f953ed8; recoverytime=Tue, 4 Feb 2020 08:49:37 GMT EXAMPLE 12: Service response with one binding indication applying to the resource context pertaining to a group identified by "54804518-4191-46b3-955c-ac631f953ed1":
3gpp-Sbi-Binding: bl=nfinstance; nfinst=54804518-4191-46b3-955c-ac631f953ed0; nfset=set1.smfset.5gc.mnc012.mcc345; group=true; groupid=54804518-4191-46b3-955c-ac631f953ed1

EXAMPLE 13: A notification request message with one binding indication applying to the resource contexts with the oldgroup identifier "54804518-4191-46b3-955c-ac631f953ed1", where the preferred binding entity is changed to "nfinst=54804519-4191-46b3-955c- ac631f953ed0" together with a new group identifier "54804519-4191-46b3-955c-ac631f953ed3" allocated.

3gpp-Sbi-Binding: bl=nfinstance; nfinst=54804519-4191-46b3-955c-ac631f953ed0; nfset=set1.smfset.5gc.mnc012.mcc345; group=true; oldgroupid=54804518-4191-46b3-955c-ac631f953ed1; groupid=54804519-4191-46b3-955c-ac631f953ed3

EXAMPLE 14: A notification request message with one binding indication applying to the resource contexts identified by an apiRoot, where the preferred binding entity is changed to "nfinst=54804519-4191-46b3-955c-ac631f953ed0".

3gpp-Sbi-Binding: bl=nfinstance; nfinst=54804519-4191-46b3-955c-ac631f953ed0; nfset=set1.smfset.5gc.mnc012.mcc345; group=true; apiroot=http%3A%2F%2F10.10.10.10

NOTE: Examples 6 and 7 are formatted as two distinct headers (which improves the readability), but they can also be formatted as a single header with two Binding Indication values separated by a comma.

6.12.1 General

A Binding Indication for an NF Service Resource may be provided to an NF Service Consumer of the resource as part of the Direct or Indirect Communication procedures, to be used in subsequent related service requests. This allows the NF Service Resource owner to indicate that the NF Service Consumer, for a particular resource, should be bound to an NF service instance, NF instance, NF service set or NF set. See clause 6.3.1.0 of 3GPP TS 23.501 [3] and clause 4.17.12 of 3GPP TS 23.502 [4].

A binding may be established or updated as part of a:
1) service response creating or modifying a resource, to be used for subsequent requests targeting this resource (see clause 4.17.12.2 of 3GPP TS 23.502 [4]), for any API that defines resources;
2) service request, if the NF Service Consumer can also act as an NF Service Producer for later communication from the contacted NF Service Producer, to be used for subsequent service requests initiated by the contacted NF Service Producer (see clause 4.17.12.3 of 3GPP TS 23.502 [4]);
3) service request creating or modifying an explicit or an implicit subscription, or as part of a notification response, to be used for subsequent notification requests initiated by the NF Service Producer (see clause 4.17.12.3 of 3GPP TS 23.502 [4]);
4) service response creating an implicit or explicit subscription or updating a subscription, or as part of a notification request, to be used for subsequent operations on the subscription (see clause 4.17.12.4 of 3GPP TS 23.502 [4]);
5) service request creating a callback (other than notification) resource (e.g. V-SMF or I-SMF callback URI sent to the H-SMF or SMF), or as part of a callback response, to be used for subsequent callback requests initiated by the NF Service Producer (e.g. H-SMF or SMF initiated PDU session modification).
6) callback request sent from a NF Service Producer to update the binding for the resource context, to be used by the NF Service Consumer for subsequent service requests addressing the resource context.

Two types of binding information are defined to manage the binding between an NF Service Consumer and an NF Service Resource:
1) A Binding Indication conveys binding information for a resource which must be stored by the consumer (client) of that resource and used by the client to direct future requests to the resource. When contained in a service request, the binding information is associated with a resource owned by the NF Service Consumer for the current transaction. When contained in a service response, the binding information is associated with a resource owned by the NF Service Producer for the current transaction.
2) A Routing Binding Indication conveys binding information to direct a request from a client to a server which has the context. A Routing Binding Indication shall only be contained in an HTTP request.

A same service request may convey more than one Binding Indication, e.g.:
 to provide bindings for notification or callback (i.e. bullets 3 or 5) and for other services that the NF service consumer can provide later as a NF Service Producer (i.e. bullet 2); or
 to provide binding information for different event notifications, when creating a subscription on behalf of another NF (see clause 6.12.4).

The scope parameter in a Binding Indication in a service request identifies the applicability of (i.e. scenario associated with) the binding information.

A service request may convey one or more Binding Indications as described above using a 3gpp-Sbi-Binding header and/or include a Binding Routing Indication to influence routing of the request e.g. to an appropriate set of NF Service Producers or to an appropriate service set of the NF Service Producer using a 3gpp-Sbi-Routing-Binding header. A service response may convey a Binding Indication for a resource using a 3gpp-Sbi-Binding header.

NOTE 1: An HTTP request can contain for instance one 3gpp-Sbi-Binding header containing two Binding Indications for other services and for callbacks, and one 3gpp-Sbi-Routing-Binding header conveying a Routing Binding Indication.

If an SCP receives a Routing Binding Indication within a service or notification request and decides to forward that request to a next-hop SCP, it shall include the Routing Binding Indication in the forwarded request. The SCP shall remove the Routing Binding Indication if it forwards the request to the target NF.

Binding Indications and Routing Binding Indications shall include the Binding level and one or more Binding entity IDs representing all NF service instances that are capable to serve service requests targeting the resource, i.e. that share the same resource contexts.

The Binding Level indicates a preferred binding to either a NF Instance, a NF set, a NF Service Instance or a NF Service Set.

When sending a request targeting the resource context in a NF Service Producer or the session context in a NF Service Consumer, the resource URI received in the Location header or the Notification/Callback URI shall be used first if available and set in the "3gpp-Sbi-Target-apiRoot" header or target URI; when it is not reachable, the binding entity corresponding to the binding level shall be selected whenever possible. If this is not possible, e.g. because the preferred binding entity is not reachable, the request should be sent to any other Binding entity signalled in the Binding Indication or Routing Binding Indication, in the following decreasing order of priority:
 select an NF service instance in the same NF service set, if a NF service Set ID was signalled in the Binding Indication or Routing Binding Indication;

select an equivalent NF service instance in the same NF instance, if an NF instance ID was signalled in the Binding Indication or Routing Binding Indication;

select an NF service instance in an equivalent NF service set of the backup AMF instance, if a NF service Set ID and backup AMF Instance ID was signalled in the Binding Indication or Routing Binding Indication;

select an equivalent NF service instance in the backup AMF instance, if backup AMF Instance ID was signalled in the Binding Indication or Routing Binding Indication;

select an NF service instance in an equivalent NF service set of another NF instance of the NF set, if an NF Service Set ID and an NF Set ID were signalled in the Binding Indication or Routing Binding Indication;

select an equivalent NF service instance in another NF instance of the NF Set, if an NF Set ID was signalled in the Binding Indication or Routing Binding Indication.

NOTE 2: NF service instances from different NF instances are equivalent NF service instances if they share the same MCC, MNC, NID (for SNPN), ServiceName, API version, and, if applicable, NF Service Set ID (see clause 28.13 of 3GPP TS 23.003 [15]).

Binding Indications shall not be used if a particular resource can only be served by a specific NF service instance of an NF instance, i.e. if NF service instances of a same NF service are not capable to share resource inside the NF Instance. A resource for which no Binding Indication or Routing Binding Indication is signalled shall be considered to be bound exclusively to one NF service instance, unless the NF Service resource owner instance is part of an NF set (or AMF set) or an NF service set, or unless its NF profile in the NRF indicates that its supports NF service persistence within the NF instance (see clause 6.5 of 3GPP TS 23.527 [38]).

A Binding Indication may be shared by multiple resource/session contexts, i.e. these resource contexts (in the NF Service Producer) or session contexts (in the NF Service Consumer) are sharing the same resilience information. The Binding Indication for multiple context has the same semantics as the one for a single resource/session context but with the following additions. When it is supported as indicated in the Supported Features for a specific service API:

both NF Service Consumer and NF Service Producer can indicate if the Binding Indication for multiple contexts; and if the Binding Indication is for multiple contexts, the "group" parameter in the Binding Indication shall be set to "true";

a group id may be included in the Binding Indication to indicate the group to which resource/session contexts pertain are sharing the same Binding Indication, when the resource/session context is created;

the Binding Indication for a group of contexts may be updated, e.g. when the NF is changed, by including an oldgroupid or apiroot to address applicable contexts for the update of the Binding Indication, and when the oldgroupid is present, the groupid shall also be present to indicate the new group id which is newly allocated.

The present disclosure further comprises the following embodiments based on the 3GPP TS 29.500.

Binding indication for a group of resources (contexts) can be conveyed with new HTTP custom header (e.g. so called "3gpp-sbi-group-binding") or extension to existing 3gpp-sbi-binding header:

The new is to identify the plural contexts, the existing binding parameters are not changed, e.g. bl.

The binding parameter (called bindingparameters in 3gpp-sbi-group-binding as below) is the same as specified in clause 5.2.3.2.6 of TS 29.500, this invention adds information to identify the plural contexts, preferably called "groupparameters" which is common in either 3gpp-sbi-group-binding or 3gpp-sbi-binding.

3gpp-sbi-group-binding="3gpp-Sbi-Group-Binding" ":" 1 #(OWS bindingparameters 1*(";" OWS groupparameters)), i.e.

3gpp-sbi-group-binding="3gpp-Sbi-Group-Binding" ":" 1 #(OWS "bl=" blvalue 1*(";" OWS parameter) [";" OWS recoverytime] 1*(";" OWS groupparameters))

or

3gpp-Sbi-Binding="3gpp-Sbi-Binding" ":" 1 #(OWS "bl=" blvalue 1*(";" OWS parameter) ";" OWS recoverytime [";" "group=true" 1*(";" OWS groupparameter)]

groupparameter=groupparametername "=" grouptoken
groupparametername="groupid"/"oldgroupid"/"apiroot"/ "regexp"

When existing 3gpp-Sbi-binding header is used, a new indication "group" is introduced, to indicate the binding indication is for a group.

The following parameters are defined:

groupid (group identifier): indicates the identifier of the group. It is a string value that can be assigned by the Binding Indication provider. The groupid is global unique, which may be encoded using UUIDv4.

oldgroupid (old group identifier): indicates the old identifier of the group, which is replaced by the new identifier carried in "groupid". This parameter is only used in updated group binding. The oldgroupid is global unique, which may be encoded using UUIDv4. When a resource (context) group is relocated to a new NF, the NF may update the group identifier when taking over the resource (context) group or merge the resource (context) group to another resource (context) group for easy management. A new group binding indication shall be provided indicating the new group identifier (carried in "groupid" parameter) replacing the old group identifier (carried in "oldgroupid" parameter).

apiroot: identify the apiroot used by the resource URI or notification URI of the group. This parameter is only used in updated group binding. When included, it indicates that all resources or notification contexts at this apiRoot will use the updated group binding subsequently. This parameter can be present more than once in the header.

regexp: indicates the regular expression pattern of the resource or notification context belonging to the group. This parameter is only used in updated group binding. When included, it indicates that all resources or notification contexts matching the pattern will use the updated group binding subsequently. This parameter can be present more than once in the header.

oldnfinst: indicates any resource contexts served by the nf instance (identified by the nfinst) will be updated with the same binding indication.

oldnfservinst: indicates any resource contexts served by the nf service instance (identified by the nfservinst) will be updated with the same binding indication.

oldnfserviceset: indicates any resource contexts served by the nf service set (identified by the nfserviceset) will be updated with the same binding indication.

EXAMPLES

EXAMPLE 12: Service response with one binding indication applying to the resource context pertaining to a group identified by "54804518-4191-46b3-955c-ac631f953ed1":
3gpp-Sbi-Binding: bl=nfinstance; nfinst=54804518-4191-46b3-955c-ac631f953ed0;
nfset=set1.smfset.5gc.mnc012.mcc345; group=true; groupid=54804518-4191-46b3-955c-ac631f953ed1

EXAMPLE 13: A notification request message with one binding indication applying to the resource contexts with the oldgroup identifier "54804518-4191-46b3-955c-ac631f953ed1", where the preferred binding entity is changed to "nfinst=54804519-4191-46b3-955c-ac631f953ed0" together with a new group identifier "54804519-4191-46b3-955c-ac631f953ed3" allocated.
3gpp-Sbi-Binding: bl=nfinstance; nfinst=54804519-4191-46b3-955c-ac631f953ed0;
nfset=set1.smfset.5gc.mnc012.mcc345; group=true; oldgroupid=54804518-4191-46b3-955c-ac631f953ed1; groupid=54804519-4191-46b3-955c-ac631f953ed3

EXAMPLE 14: A notification request message with one binding indication applying to the resource contexts identified by an apiRoot, where the preferred binding entity is changed to "nfinst=54804519-4191-46b3-955c-ac631f953ed0":
3gpp-Sbi-Binding: bl=nfinstance; nfinst=54804519-4191-46b3-955c-ac631f953ed0;
nfset=set1.smfset.5gc.mnc012.mcc345; group=true; apiroot=http://10.10.10.10

---3GPP TS 29.500--------------------------------------------------------

5.2.3.2.6 3gpp-Sbi-Binding

This header contains a comma-delimited list of Binding Indications from an HTTP server for storage and subsequent use by an HTTP client (see clause 6.12).

The encoding of the header follows the ABNF as defined in IETF RFC 7230 [12].

3gpp-Sbi-Binding="3gpp-Sbi-Binding" ":" 1 #(OWS "bl=" blvalue 1*(";" OWS parameter) ";" OWS recoverytime)
blvalue="nf-instance"/"nf-set"/"nfservice-instance"/"nfservice-set"
parameter=parametername "=" token
parametername="nfinst"/"nfset"/"nfservinst"/"nfservice-set"/"servname"/"scope"/"groupid"/"oldgroupid"/"oldnfinst"/"oldnfservinst"/"oldnfserviceset"/"apiroot"
recoverytime="recoverytime=" OWS date-time
group="group=" OWS "true"/"false"

The following parameters are defined:
scope: indicates the applicability of a Binding Indication in a service request. This may take one of the following values:
"other-service": the binding information applies to other service(s) that the NF Service Consumer may later on provide as an NF Service Producer (see clause 6.12.3);
"subscription-events": the binding information applies to subscription change event notifications (see clause 6.12.4);
"callback": the binding information applies to notification or callback requests (see clauses 6.12.4 and 6.12.5).
The absence of this parameter in a Binding Indication in a service request shall be interpreted as "callback".

Two scope parameters may be present in a Binding Indication if the binding information applies to notification/callback requests and to other services.

servname (service name): indicates the name of a service, as defined in 3GPP TS 29.510 [8], or a custom service, i.e.:
the name of the service that handles a notification or a callback request, when present in a Binding Indication for a subscription or a callback, i.e. with a scope parameter absent or set to "callback"; or
the name of the other service(s) for which the binding applies, when present in a Binding Indication in a service request for the other services the NF Service Consumer can provide later on as an NF Service Producer, i.e. with the scope parameter set to "other-service". More than one servname parameter may be present to represent multiple such services. The absence of this parameter in a Binding Indication with the scope parameter set to "other-service" shall be interpreted as binding information that applies to all the services that the NF Service Consumer may provide later as an NF Service Producer.

recoverytime: indicates the recovery timestamp of the entity corresponding to the highest resiliency level supported for the resource, that is, the higher level binding entity indicated in the Binding Indication. See Table 6.3.1.0-1 of 3GPP TS 23.501 [3] and clause 6.1 of 3GPP TS 23.527 [38]. The date-time type is specified in IETF RFC 5322 [37] and clause 7.1.1.1 of IETF RFC 7231 [11].

groupid (group id): indicates the group identifier of the group binding.

oldgroupid (old group binding): indicates the group identifier of an old group binding, which is merged to the current group binding.

oldnfinst: indicates any resource contexts served by the nf instance (identified by the nfinst) will be updated with the same binding indication.

oldnfservinst: indicates any resource contexts served by the nf service instance (identified by the nfservinst) will be updated with the same binding indication.

oldnfserviceset: indicates any resource contexts served by the nf service set (identified by the nfserviceset) will be updated with the same binding indication.

apiroot: identify the apiroot used by the resource URI or notification URI of the group. This parameter is only used in updated group binding. When included, it indicates that all resources or notification contexts at this apiRoot will use the updated group binding subsequently. This parameter can be present more than once in the header.

regexp: indicates the regular expression pattern of the resource or notification context belonging to the group. This parameter is only used in updated group binding. When included, it indicates that all resources or notification contexts matching the pattern will use the updated group binding subsequently. This parameter can be present more than once in the header.

for the definition and encoding of the blvalue, nfinst, nfset, nfservinst and nfserviceset see clause 5.2.3.2.5.

EXAMPLES 1 to 5: Same as EXAMPLES 1 to 5 defined in clause 5.2.3.2.5, with the header name "3gpp-Sbi-Binding" instead of "3gpp-Sbi-Routing-Binding".

EXAMPLE 6: Subscription request from one NF on behalf of another NF, with 2 binding indications:
3gpp-Sbi-Binding: bl=if-set;
nfset=set1.udmset.5gc.mnc012.mcc345;

servname=nudm-ee;scope=subscription-events
3gpp-Sbi-Binding: bl=if-set; nfset=set1.nefset.5gc.mnc012.mcc345; servname=nnef-event-exposure EXAMPLE 7: Service request with 2 binding indications, for callback requests and for other services the NF Service Consumer may provide later as an NF Service Producer:
3gpp-Sbi-Binding: bl=nf-instance; nfinst=54804518-4191-46b3-955c-ac631f953ed8; nfset=set1.smfset.5gc.mnc012.mcc345; servname=nsmf-pdusession
3gpp-Sbi-Binding: bl=nf-instance; nfinst=54804518-4191-46b3-955c-ac631f953ed8; nfset=set1.smfset.5gc.mnc012.mcc345; scope=other-service; servname=nsmf-event-exposure EXAMPLE 8: Service request with one binding indication applying to notification/callback requests and to any other services the NF Service Consumer may provide later as an NF Service Producer:
3gpp-Sbi-Binding: bl=nf-set; nfset=set1.region48.amfset.5gc.mnc012.mcc345; scope=callback; scope=other-service EXAMPLE 9: Service request with one binding indication applying to notification/callback requests together with a recovery time stamp associated with the NF Set indicated in the binding indication and with the binding level set to "nfset":
3gpp-Sbi-Binding: bl=nfset; nfset=set1.region48.amfset.5gc.mnc012.mcc345; scope=callback; recoverytime=Tue, 4 Feb 2020 08:49:37 GMT EXAMPLE 10: Service response with one binding indication applying to the session context with a recovery time stamp associated with the NF Set indicated in "nfset" in the binding indication and with the binding level set to "nfinstance":
3gpp-Sbi-Binding: bl=nfinstance; nfinst=54804518-4191-46b3-955c-ac631f953ed8; nfset=set1.smfset.5gc.mnc012.mcc345; recoverytime=Tue, 4 Feb 2020 08:49:37 GMT EXAMPLE 11: Service response with one binding indication applying to the session context with a recovery time stamp associated with the NF Instance included the binding indication and with the binding level set to nfserviceinstance:
3gpp-Sbi-Binding: bl=nfserviceinstance; nfservinst=xyz; nfinst=54804518-4191-46b3-955c-ac631f953ed8; recoverytime=Tue, 4 Feb 2020 08:49:37 GMT EXAMPLE 10: Service response with one group binding indication applying to the session context with group identifier "54804518-4191-46b3-955c-ac631f953ed8-1", where the NF Set indicated in "nfset" in the binding indication and with the binding level set to "nfinstance":
3gpp-Sbi-Binding: bl=nfinstance; nfmnst=54804518-4191-46b3-955c-ac631f953ed8; nfset=set1.smfset.5gc.mnc012.mcc345; groupid=54804518-4191-46b3-955c-ac631f953ed8-1

NOTE: Examples 6 and 7 are formatted as two distinct headers (which improves the readability), but 50 they can also be formatted as a single header with two Binding Indication values separated by a comma.

6.5.3.2 Stateless NF as Service Consumer

1. When the NF service consumer subscribes to notifications from another NF service producer, the NF service consumer may provide a binding indication to the NF service producer as specified in clause 6.3.1.0 of 3GPP TS 23.501 [3] and clause 4.17.12.4 of 3GPP TS 23.502 [4], to enable the related notifications to be sent to an alternative NF within the NF set, in addition to providing the Callback URI in the subscription resource.
2. A NF service producer or SCP may use the Nnrf_NF-Discovery service to discover NFs within an NF set.
3. An NF service producer may become aware of a NF service consumer change, via receiving an updated binding information, or via an Error response to a notification, via link level failures (e.g. no response from the NF), or via a notification from the NRF that the NF has deregistered. The HTTP error response may be a 3xx redirect response pointing to a new NF. An NF service producer may become aware of a NF service consumer change for a group of subscriptions/callbacks, via receiving an updated group binding information.
4. When becoming aware of an NF service consumer change, and the new NF service consumer is not known, the NF service producer shall select an NF according to the binding indication as specified in clause 6.3.1.0 of 3GPP TS 23.501 [3] and clause 4.17.12.4 of 3GPP TS 23.502 [4]. If the subscription/callback is associated with a group binding, the selected NF consumer shall be applied to other subscriptions/callbacks within the group.
5. When becoming aware of an NF service consumer change, the NF service producer or SCP shall exchange the authority part of the Notification URI with new NF service consumer information and shall use that URI in subsequent communication. If the subscription/callback is associated with a group binding, the NF service producer shall exchange the authority part of the Notification URI with new NF service consumer information for other subscriptions/callbacks associated with the same group binding.
6. When the NF service consumer is changed, and the new NF service consumer does not support handling the notifications as specified in bullet 5, the new NF service consumer should update NF service producers with the new Notification URI. For explicit subscriptions, the NF service consumer should update the subscription or create a new subscription with the new callback URI, depending on the NF service producer's API. For implicit subscriptions, the new Notification URI is carried in a service update request message.
7. Each NF within the NF set shall be prepared to receive notifications from the NF service producer, by either handling the notifications to the Notification URI constructed according to bullet 5 with the own address as authority part, or by handling the notifications to the Notification URI notified in bullet 6, or by replying with an HTTP 3xx redirect pointing to a new NF or with another HTTP error.
8. The NF service producer shall be prepared to receive updates to resources of the related service from any NF within the set.

6.5.3.3 Stateless NF as Service Producer

1. When the NF service producer receives a request to establish a service, it may provide binding information as specified in clause 6.3.1.0 of 3GPP TS 23.501 [3] and clause 4.17.12 of 3GPP TS 23.502 [4] to establish a binding between the NF service consumer and the NF service producer for subsequent related requests.
2. The NF service consumer or SCP may use the Nnrf_NFDiscovery service to discover NFs within an NF set or NF services within a NF service set.

3. An NF service consumer may become aware of a NF service producer change, by receiving an updated binding information, or via an Error response from the old or a selected new NF, via link level failures (e.g. no response from the NF), or via a notification from the NRF that the NF has deregistered. The HTTP error response may be a 3xx redirect response pointing to a new NF. An NF service consumer may become aware of a NF service producer change for a group of resources, via receiving an updated group binding information.

4. When becoming aware of a NF service producer change, and the new NF service producer is not known, the NF service consumer or SCP shall select an NF or NF service according to the binding information as specified in clause 6.3.1.0 of 3GPP TS 23.501 [3]. If the resource is associated with a group binding, the selected new NF producer shall be applied to other resources associated with the same group binding.

5. When becoming aware of a NF service producer change, the NF service consumer or SCP shall exchange the apiRoot of resource URIs with new NF service producer's apiRoot and shall use that URI in subsequent communication. If the resource is associated with a group binding, the NF service consumer shall exchange the apiRoot of the resource URI with new NF service producer's apiRoot for other resources associated with the same group binding.

6. When the NF service producer changes, the new NF service producer may update the Subscription Correlation ID by sending a notification to the NF service consumer. The new NF service producer may generate a new resource URI and return it to the NF service consumer upon reception of a service request related to the resource from that NF service consumer, e.g. the new NF service producer may reply with an HTTP 3xx redirect status code pointing to the new location of the resource.

7. Each NF service producer within the NF set shall be prepared to receive updates for resources from the NF service consumer, by either handling the updates to the resource URIs constructed according to step 5 with its own apiRoot, or by handling the updates to the resource URIs notified in step 6, or by replying with an HTTP 3xx redirect pointing to a new NF, or by replying with another HTTP error.

8. For a service that includes notifications from the NF service producer, the NF service consumer shall be prepared to receive for that service notifications from any NF service producer within the set.

The invention claimed is:

1. A method in a first Network Function (NF) comprising:
transmitting, to a second NF, a message containing a first binding indication associated with a context hosted by the first NF, the message or the first binding indication containing a parameter identifying a group of contexts, wherein the first binding indication further indicates that the first binding indication is for the group of contexts, wherein the message or the first binding indication further containing an indication that the message is for multiple-context operation when the parameter is carried in a 3gpp-Sbi-Binding header or a 3gpp-Sbi-Routing-Binding header, and wherein the parameter comprises:
 a first group identifier;
 an Application Programming Interface (API) root (apiRoot) or a regular expression that is common to respective previous Uniform Resource Identifiers (URIs) for the group of contexts; or
 both the first group identifier, and the apiRoot or a regular expression that is common to respective previous URIs for the group of contexts.

2. The method of claim 1, wherein the message comprises a service request, a service response, a subscription request, a subscription response, a notification request, a callback request, a notification response, or a callback response.

3. The method of claim 1, wherein the parameter further comprises:
 an NF service instance identifier,
 an NF service set identifier,
 an NF instance identifier, or
 any combination thereof, and
identifying an entity where the group of contexts was hosted previously.

4. The method of claim 3, wherein when the parameter comprises the first group identifier, the method further comprising:
 prior to transmitting the message containing the first binding indication, transmitting, to the second NF, a request or response associated with at least one of the group of contexts, the request or response transmitted prior to the message containing a second binding indication associated with the at least one of the group of contexts, the request or response transmitted prior to the message associated with the second binding indication containing the first group identifier, or the second binding indication containing the first group identifier.

5. The method of claim 1, wherein the message or the first binding indication further contains a second group identifier assigned by the first NF for the group of contexts.

6. The method of claim 1, further comprising:
 retrieving, from an NF Repository Function (NRF), an NF profile of the second NF, the NF profile containing an indication of support of multiple-context operation; or
 receiving, from the second NF, a request or response containing an indication of support of multiple-context operation.

7. A method in a second Network Function (NF) comprising:
 receiving, from a first NF, a message containing a first binding indication associated with a context hosted by the first NF, the message or the first binding indication containing a parameter identifying a group of contexts, wherein the first binding indication further indicates that the first binding indication is for the group of contexts, wherein the message or the first binding indication further containing an indication that the message is for multiple-context operation when the parameter is carried in a 3gpp-Sbi-Binding header or a 3gpp-Sbi-Routing-Binding header; and
 performing an operation for each of the group of contexts based on the first binding indication, wherein the parameter comprises:
  a first group identifier;
  an Application Programming Interface (API) root (apiRoot) or a regular expression that is common to respective previous Uniform Resource Identifiers (URIs) for the group of contexts; or both the first group identifier, and the apiRoot or a regular expression that is common to respective previous URIs for the group of contexts.

8. The method of claim 7, wherein the message comprises a service request, a service response, a subscription request, a subscription response, a notification request, a callback request, a notification response, or a callback response.

9. The method of claim 7, wherein the parameter further comprises:
an NF service instance identifier,
an NF service set identifier,
an NF instance identifier, or
any combination thereof, and
identifying an entity where the group of contexts was hosted previously.

10. The method of claim 9, wherein when the parameter comprises the first group identifier, the method further comprising:
prior to receiving the message containing the first binding indication, receiving, from the first NF or from a third NF, a request or response associated with at least one of the group of contexts, the request or response containing a second binding indication associated with the at least one of the group of contexts, the request or response or the second binding indication containing the first group identifier.

11. The method of claim 7, wherein the message or the first binding indication further contains a second group identifier assigned by the first NF for the group of contexts.

12. The method of claim 7, further comprising:
registering, in an NF Repository Function (NRF) an NF profile containing an indication of support of multiple-context operation; or
transmitting, to the first NF, a request or response containing an indication of support of multiple-context operation.

13. The method of claim 7, wherein said performing comprises updating binding information for each of the group of contexts based on the first binding indication.

14. The method of claim 13, wherein the first binding indication contains a first binding entity corresponding to a binding level, and said performing further comprises, when a binding entity is changed from a second binding entity corresponding to the binding level in the binding information for any one context of the group of contexts prior to said updating:
determining a binding entity change associated with the one context; and
redirecting the one context to the first binding entity.

15. The method of claim 14, wherein said redirecting comprises:
replacing a URI for the one context based on an a piRoot of the first binding entity.

16. A network node comprising:
a communication interface;
a processor; and
a memory, the memory comprising instructions which, when executed by the processor, cause the network node, when implementing a first Network Function (NF), to perform operations to:
transmit, to a second NF, a message containing a first binding indication associated with a context hosted by the first NF, the message or the first binding indication containing a parameter identifying a group of contexts, wherein the first binding indication further indicates that the first binding indication is for the group of contexts, wherein the message or the first binding indication further containing an indication that the message is for multiple-context operation when the parameter is carried in a 3gpp-Sbi-Binding header or a 3gpp-Sbi-Routing-Binding header, and wherein the parameter comprises:
a first group identifier,
an Application Programming Interface (API) root (apiRoot) ora regular expression that is common to respective previous Uniform Resource Identifiers (URIs) for the group of contexts, or
both the first group identifier, and the apiRoot or a regular expression that is common to respective previous URIs for the group of contexts.

* * * * *

UNITED STATES PATENT AND TRADEMARK OFFICE
CERTIFICATE OF CORRECTION

PATENT NO. : 12,058,004 B2
APPLICATION NO. : 18/263700
DATED : August 6, 2024
INVENTOR(S) : Yang et al.

It is certified that error appears in the above-identified patent and that said Letters Patent is hereby corrected as shown below:

In the Specification

In Column 1, Line 46, delete "data." and insert -- data). --, therefor.

In Column 4, Line 42, delete "leads a" and insert -- leads to a --, therefor.

In Column 22, Line 29, delete "use equipment" and insert -- user equipment --, therefor.

In Column 25, Line 43, delete "one ore more" and insert -- one or more --, therefor.

In Column 25, Line 54, delete "the if the" and insert -- the --, therefor.

In Column 26, Line 3, delete "bl=if-set;" and insert -- bl=nf-set; --, therefor.

In Column 26, Line 6, delete "bl=if-set;" and insert -- bl=nf-set; --, therefor.

In Column 26, Line 12, delete "nfmnst" and insert -- nfinst --, therefor.

In Column 26, Line 16, delete "nfmnst" and insert -- nfinst --, therefor.

In Column 27, Line 57, delete "modification)." and insert -- modification); --, therefor.

In Column 30, Lines 18-19, delete "groupparameter)]" and insert -- groupparameter)]) --, therefor.

In Column 32, Line 66, delete "bl=if-set;" and insert -- bl=nf-set; --, therefor.

In Column 33, Line 2, delete "bl=if-set;" and insert -- bl=nf-set; --, therefor.

In Column 33, Line 55, delete "nfmnst" and insert -- nfinst --, therefor.

Signed and Sealed this
Eleventh Day of February, 2025

Coke Morgan Stewart
*Acting Director of the United States Patent and Trademark Office*

CERTIFICATE OF CORRECTION (continued)
U.S. Pat. No. 12,058,004 B2

In Column 33, Line 60, delete "but 50" and insert -- but --, therefor.

In the Claims

In Column 38, Line 11, in Claim 15, delete "a piRoot" and insert -- apiRoot --, therefor.

In Column 38, Line 35, in Claim 16, delete "ora" and insert -- or a --, therefor.